(12) United States Patent
Khandekar

(10) Patent No.: US 7,979,377 B2
(45) Date of Patent: Jul. 12, 2011

(54) METHOD AND SYSTEM OF DEPLOYING SERVER-BASED APPLICATIONS

(75) Inventor: Pramod Khandekar, Edison, NJ (US)

(73) Assignee: InstaKnow.com Inc., Edison, NJ (US)

( * ) Notice: Subject to any disclaimer, the term of this patent is extended or adjusted under 35 U.S.C. 154(b) by 827 days.

(21) Appl. No.: 12/012,951

(22) Filed: Feb. 6, 2008

(65) Prior Publication Data

US 2008/0201653 A1 Aug. 21, 2008

Related U.S. Application Data

(60) Continuation of application No. 11/374,487, filed on Mar. 13, 2006, now Pat. No. 7,437,342, which is a division of application No. 09/714,903, filed on Nov. 16, 2000, now Pat. No. 7,073,126.

(60) Provisional application No. 60/166,247, filed on Nov. 18, 1999, provisional application No. 60/171,143, filed on Dec. 16, 1999, provisional application No. 60/174,747, filed on Jan. 4, 2000.

(51) Int. Cl.
*G06N 5/00* (2006.01)

(52) U.S. Cl. .......................... 706/47; 706/45

(58) Field of Classification Search .............. 706/47, 706/45

See application file for complete search history.

(56) References Cited

U.S. PATENT DOCUMENTS

| 5,859,637 | A | 1/1999 | Tidwell, II |
| 5,892,909 | A | 4/1999 | Grasso et al. |
| 6,104,393 | A | 8/2000 | Santos-Gomez |
| 6,128,622 | A | 10/2000 | Bach et al. |
| 6,202,199 | B1 | 3/2001 | Wygodny et al. |
| 6,237,135 | B1 | 5/2001 | Timbol |
| 6,263,352 | B1 | 7/2001 | Cohen |
| 6,282,546 | B1 | 8/2001 | Gleichauf et al. |
| 6,285,998 | B1 | 9/2001 | Black et al. |
| 6,353,447 | B1 | 3/2002 | Truluck et al. |
| 6,502,234 | B1 | 12/2002 | Gauthier et al. |
| 6,532,453 | B1 | 3/2003 | Koza et al. |
| 6,609,205 | B1 | 8/2003 | Bernhard et al. |
| 6,704,030 | B1 | 3/2004 | McDonald et al. |

(Continued)

OTHER PUBLICATIONS

Cunningham, et al., Business Objects Data Integration: A Technical Overview, White Paper, Business Objects, 2005, pp. 1-27.*
Webpages from webMethods website "Resolve Complex B2B Integration Challenges Once and for All" (www.webmethods.com).
Webpages from Knowmadic Inc. website (www.knowmadic.com).
Webpages from Aonix website (www.aonix.com) © 1999.

(Continued)

*Primary Examiner* — Wilbert L Starks, Jr.
(74) *Attorney, Agent, or Firm* — Lerner, David, Littenberg, Krumholz & Mentlik, LLP

(57) ABSTRACT

A computer implemented method of constructing a computer application for automatically implementing a complex comparison programming task provides a compare design wizard to a display of a user's computer. The user interacts with the compare design wizard to specify (a) at least first and second data groups each containing associated data elements, (b) one or more keys from the first data group, and (c) one or more keys from the second data group, the keys comprising data elements that the user desires to be compared by the computer application. The user further interacts with the compare design wizard to specify one or more actions to be taken by the computer application based on data element comparisons to be performed by the computer application of: the keys matching between the first and second data groups; excess data being found in one of the groups; and excess data being found in a different one of the groups.

9 Claims, 27 Drawing Sheets

U.S. PATENT DOCUMENTS

| | | |
|---|---|---|
| 6,806,890 B2 | 10/2004 | Audleman et al. |
| 6,816,880 B1 | 11/2004 | Strandberg et al. |
| 6,833,847 B1 | 12/2004 | Boegner et al. |
| 2004/0172268 A1 | 9/2004 | Franklin et al. |
| 2004/0239982 A1 | 12/2004 | Gignac |

OTHER PUBLICATIONS

Webpages from Vignette website "The Right Content in the Right Context at the Right Time" (www.vignette.com) © 1996-2000.

Brochure, "Vignette eContent," Vignette © 1997-2000.

* cited by examiner

"Compare"

METHOD AND SYSTEM OF DEPLOYING SERVER-BASED APPLICATIONS

CROSS-REFERENCE TO RELATED APPLICATIONS

This application is a continuation of U.S. application Ser. No. 11/374,487, filed on Mar. 13, 2006, which is a divisional of U.S. application Ser. No. 09/714,903, filed on Nov. 16, 2000, which claims the benefit of U.S. Provisional Application No. 60/174,747, filed Jan. 4, 2000, U.S. Provisional Application No. 60/166,247, filed Nov. 18, 1999, and U.S. Provisional Application No. 60/171,143, filed Dec. 16, 1999, the disclosures of which are hereby incorporated by reference herein.

FIELD OF THE INVENTION

The present invention relates to business rules based application development and the deployment of such applications. In particular, the present invention provides for the development of customized applications using basic business rules and logic such that a software programmer is not needed and provides for the deployment of such applications on server computers in response to client browser requests without the need for business logic coding in multiple places on the server.

BACKGROUND OF THE INVENTION

The Internet and World Wide Web (the "Web") are expanding globally with millions of new users being added every month. This expansion has resulted in more and more business processes being deployed on Web servers. Web servers are Web-connected computers that receive requests from client Web browsers, run the required application processes, and send the response back to the client Web browser for the next action from the client.

A business process is a unique sequence of detailed business actions carried out at a specific time to achieve a specific business result. Each process has a distinct start and a distinct end point. A typical application has many processes that can be run independent of each other.

Conventionally, to develop customized software applications, a business user either had to be a computer programmer or hire a computer programmer to write code to implement the desired business logic. In the case of hiring a programmer, the business user typically has to wait for weeks or months in order to get the application built, tested, debugged and operational.

Likewise, to deploy applications on a Web server, program code is written and deployed on the Web server. Depending upon inputs from the client, this code executes a specific set of business logic, which is typically kept in a special program called a DLL (Dynamic Link Library) and generates HTML (Hypertext Markup Language) output to be sent to the client's Web browser.

A DLL is a set of routines that can be called from procedures and is loaded and linked into an application at run time. HTML is language used to create documents on the Web with hypertext links. HTML defines the structure and layout of a Web page by using a variety of tags and attributes. An HTML tag consists of a directive, possibly extended with one or more attributes, within angle brackets, for example <FONT SIZE=3>. There are many such tags that can be used to format and layout the information on a Web page. For instance, the tag <P> is used to make paragraphs and <I> ... </I> is used to italicize fonts. Tags can also specify hypertext links, which automatically direct users to other Web pages with a single click of the mouse on the link.

On Microsoft operating systems, a Microsoft supplied component known as ASP (Active Server Pages) is required to get the request from the Web browser, run the appropriate application logic or DLL, construct an HTML output, and then send the output to the browser. ASP allows Web pages to be dynamically created by the Web server and uses scripting known as ActiveX, which provides a set of rules for how applications share information.

ActiveX uses COM (Component Object Model) components, which are binary files (such as .DLL, .ocx, or .exe files) that support the Microsoft COM standard for providing objects. Objects are generally entities that consist of both data and instructions for how to manipulate the data. COM components enable programmers to develop objects that can be accessed by any COM-compliant application. ActiveX and ActiveX controls are based on COM. ActiveX controls can be developed using a variety of programming languages such as C, C++, Java and Visual Basic. An ActiveX control, for example, can be automatically downloaded and run by a Web browser.

With ASP, one can combine HTML pages, script commands, and COM components to create interactive Web pages or Web-based applications. When a Web browser requests a Web page created by ASP (i.e., a Web page with a .ASP file extension), the Web server computer generates a page with HTML code and sends it back to the Web browser.

A convention use of ASP to deploy Web server applications is shown in FIG. 1, where a client browser computer 10 communicates via the Internet or Web 11 with Web server computer 12. Web server computer 12 includes the typical components found in a Web server computer, including for example, ROM and RAM memory, hard drive memory, a microprocessor, monitor, keyboard, mouse, etc. Web server 12 computer is configured with ASP software, which includes an ASP router component 14, DLL components 16, an HTML builder component 18, and a final HTML output component 19. DLL component 16, in this example, consists of three discrete processes including a Customer DLL 16a, an Order DLL 16b and a Shipment DLL 16c. Associated with each of ASP router component 14, DLL component 16, and HTML builder component 18 is separate business logic, which typically is programmed for each such component by a computer programmer familiar with ASP (ASP scripting. Thus, the use of ASP requires that the business logic be spread over many different components of ASP (ASP router, DLL business Logic, HTML builder and HTML output components) and requires specific programming skills and knowledge.

SUMMARY OF THE INVENTION

One aspect of the present invention provides a computer-implemented method for running applications on a server computer and generating Web page information to be displayed on one or more client computers connected to the server computer via the Internet. The method comprises: sending data from a client computer to a server computer running a DLL, the data comprising an identify of a user selected application, Web page information associated with a Web page displayed on the client computer, and user-entered information used with the application; running the DLL to retrieve the data and to identify one or more executable processes within the selected application; executing the identified processes within the DLL in association with the user-information to generate output information; generating Web page information used to form a Web page viewable at the client computer by the DLL, the Web page information containing the output information; and forwarding the Web page information to the client computer for display.

Preferably, the Web page information is forwarded to an ASP layer and comprises HTML output, and preferably HTML tags. The Web page information preferably comprises an incoming screen name from the current screen being viewed at the client computer. The DLL also desirably runs a routing subroutine to select one or more executable processes by reference to parameters of incoming screen name, application file name and a selected screen element. Most preferably, the client computer is configured to run a Web browser for sending and receiving information to and from the server computer.

Another aspect of the present invention provides a computer-implemented method for running applications on a server computer connected via a network to one or more client computers, comprising: receiving requests at the server computer from a client computer running a browser program; running an application in response to the requests; constructing coded information used to form output by the browser program based on results generated from the application; and forwarding the coded information to the browser program, wherein all necessary business logic for receiving the requests, running the application, and constructing the coded information is contained within a single linkable library of executable functions. Preferably, the single linkable library of executable functions resides exclusively in the Web server computer and comprises a DLL.

A further aspect of the present invention provides a computer-implemented method for running applications in a networked computing environment. This method comprises: sending requests from a client computer running a browser program; receiving the requests at a server computer; running an application in response to the requests; constructing output information at the server computer in a format used by the browser program based on results generated from the application; and forwarding the output information to the browser program for display at the client computer, wherein all necessary business logic for receiving the requests, running the application, and constructing the output information is contained within a single linkable library of executable functions.

Another aspect of the present invention provides a computer-based system for running applications in a networked computing environment. The system comprises a client computer running a browser program and a server computer for receiving requests from the client computer via network connecting the client and server computers. The server computer runs an application to respond to the requests, construct output information in a format usable by the browser program based on results generated from the application, and forward the output information to the browser program for display at the client computer. All of the necessary business logic for receiving the requests, running the application, and constructing the output information is contained within a single linkable library of executable functions.

A still further aspect of the present invention is a computer readable medium storing a set of instructions for controlling a server computer in a networked computing environment including a client computer running a browser program, a server computer for receiving requests from the client computer, and a computer network interfacing the client and server computers. The medium comprises a single linkable library of executable functions and a set of instructions resident in server computer for causing the server computer to (i) run an application to respond to requests from the client computer, (ii) construct output information in a format used by the browser program based on results generated from the application, and (iii) forward the output information to the browser program for display at the client computer, wherein all necessary business logic for receiving the requests, running the application, and constructing the output information is contained within the single linkable library of executable functions. Preferably, the application is run at least in part on server computer.

Another embodiment of the present invention provides a computer-implemented method for developing a business rules based application, comprising: proving a set of wizards selectable by a user; providing a set of verbs selectable by the user to implement business rules used in the application; choosing at least one of the verbs to define an action to be performed by the application when executed; and selecting at least one of the wizards to specify actions to be performed by the application when executed.

Desirably, the computer-implemented method for developing a business rules based application, comprises proving a set of wizards selectable by a user, including a data extraction wizard and an assignment wizard; providing a set of verbs to be used to implement business rules used in the application; choosing a verb to define at least one input criteria to be specified by the user of the application when executed; selecting the data extraction wizard to instruct the application to extract initial data from a first location; selecting the assignment wizard to specify a location for the application to store the initial data; selecting the data extraction wizard to instruct the application to extract secondary data from a second location, the secondary data being selected based on the initial data; and selecting the assignment wizard to specify a location for the application to store the secondary data.

Yet another aspect of the present invention provides a computer-implemented method of constructing a computer application for automatically implementing a complex comparison programming task. The method includes providing a compare design wizard to a display of a user's computer, wherein the user interacts with the compare design wizard to specify (a) at least first and second data groups each containing associated data elements, (b) one or more keys from the first data group, and (c) one or more keys from the second data group, the keys comprising data elements that the user desires to be compared by the computer application. The user further interacting with the compare design wizard to specify one or more actions to be taken by the computer application based on data element comparisons to be performed by the computer application of: the keys matching between the first and second data groups; excess data being found in one of the groups; and excess data being found in a different one of the groups.

A computer-readable storage medium storing instructions is also provided, along with a computer apparatus, for constructing a computer application for automatically implementing a complex comparison programming task by user interaction with the above-described compare design wizard.

DETAILED DESCRIPTION OF THE PREFERRED EMBODIMENTS

Figure 1:
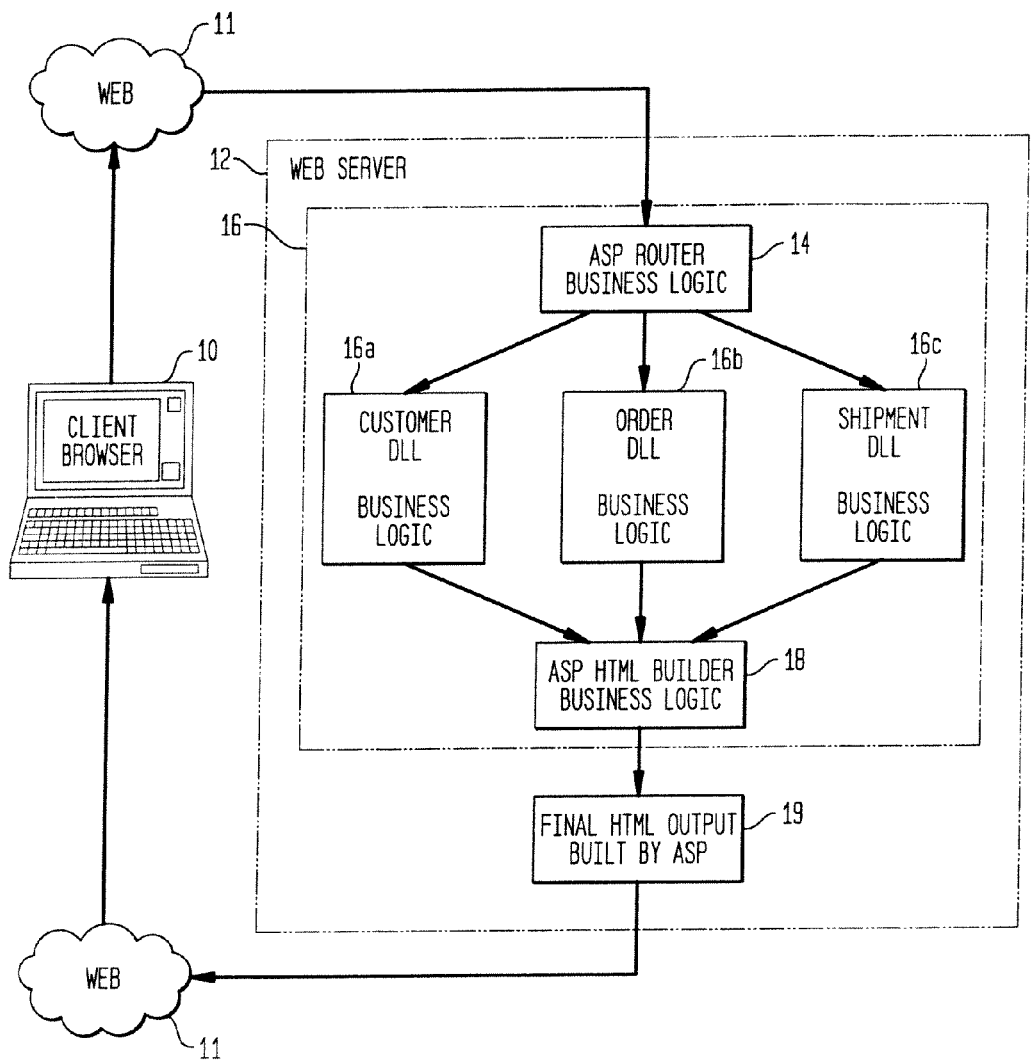
FIG. 1 is a block diagram depicting the logical structure of a prior art approach to deploying Web server applications using ASP.
Figure 2:
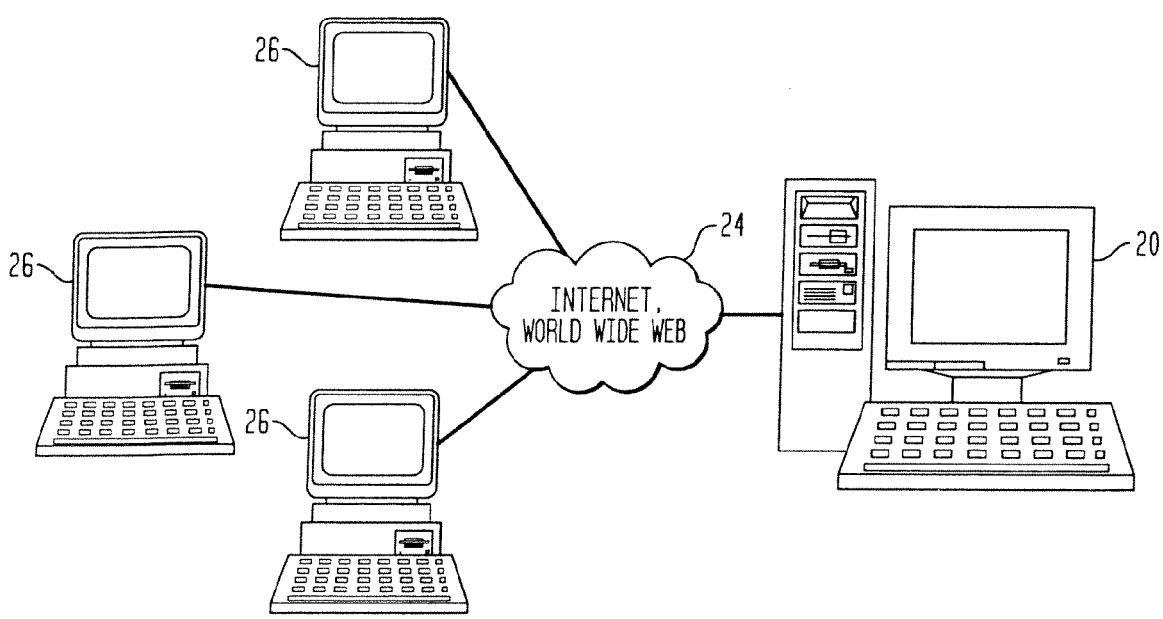
FIG. 2 is a block diagram showing the interconnection of various computers used in accordance with a preferred embodiment of the present invention.

The present invention is preferably implemented in the form of software that is adapted to run on a Web server computer. The software can be stored on storage media such floppy disks, CD-ROM, hard disk, RAM, etc. and installed on the Web server. In a typical Web server set-up, as shown in FIG. 2, a Web server 24 is adapted to connect to the Internet or the Web 24 in the typical way to deliver Web pages to client computers 26. Client computers 26 run software such as Web browsers and connect to the Web in the typical fashion (e.g., dial-up access, cable modem, DSL, T-1 connection, etc.). Typical Web browsers include Microsoft Internet Explorer or Netscape Navigator, running on operating systems such Microsoft Windows (CE, 95, 98, NT, 2000), Mac OS, DOS, Unix, etc. Client computers 26 can comprise other devices beyond PCs, which connect to the Web in a wired or wireless fashion such as PDAs, notebook computers, mobile phones, etc. Web server 20 typically has a unique IP (Internet Protocol) address and associated domain name. Entering a URL (Uniform Resource Locator) into a Web browser running on a client computer 26 sends a request via the Web 24 to Web server 20, which then acts on the request, and fetches and sends a Web page back to the client's browser program for display. Web server 20 can comprise one or more computers (e.g., PC, Macintosh, mainframe, mini-computer, etc.) and runs the necessary underlying software to allow it to be connected to the Web and communicate with Web browser.

Figure 3:
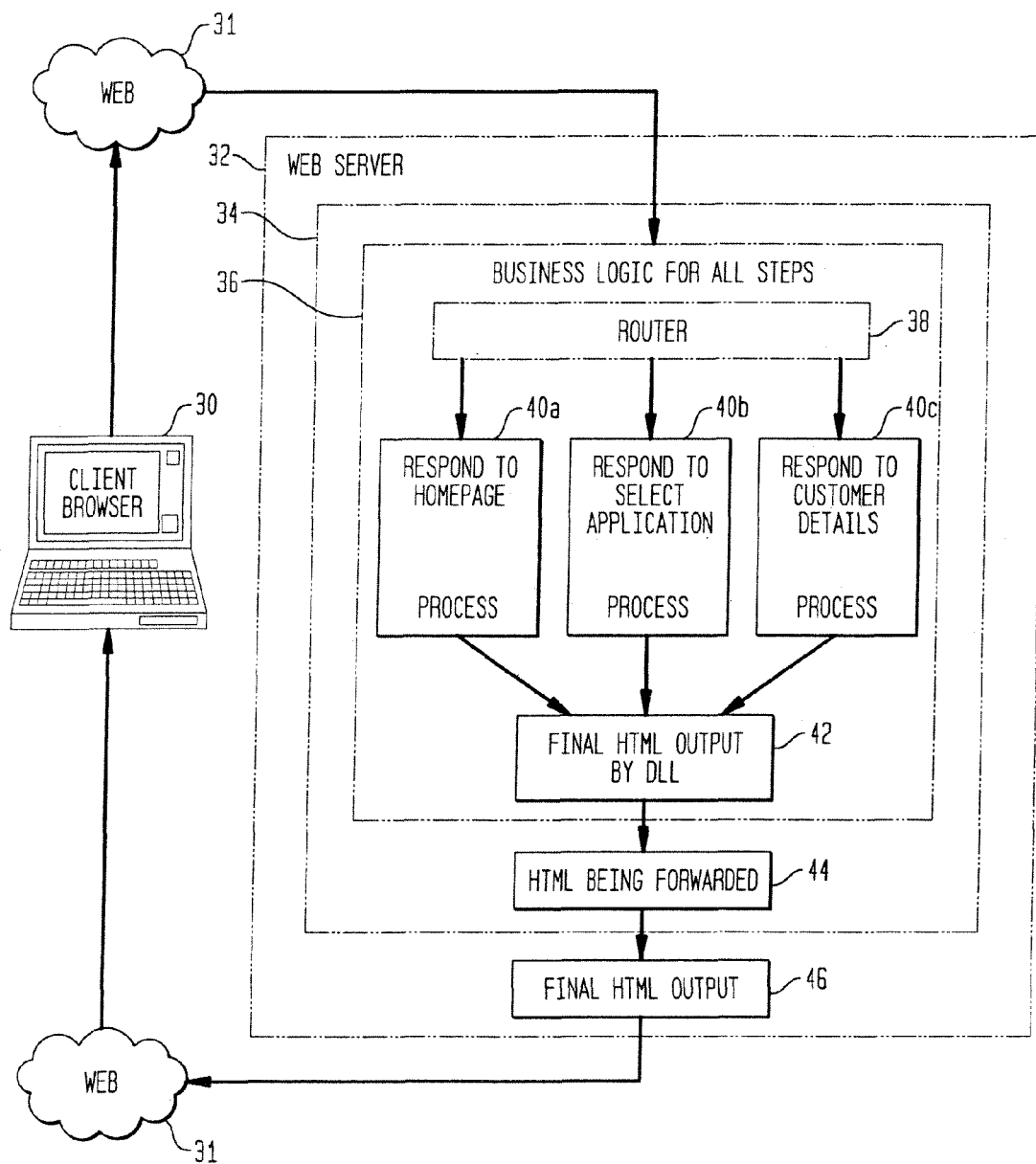
FIG. 3 is a block diagram depicting the logical structure of the deployment of Web server applications in accordance with a preferred embodiment of the present invention.

Turning to FIG. 3, a block diagram of the logic structure of elements or modules used in accordance with one aspect of the present invention is shown. Client browser 30 is connected to Web server 32 via the Web 31 in the conventional manner (dial-up, T-1, cable modem etc.). Web server 32 runs software, which provides a "blind" ASP-type layer without business logic, which, in accordance with the present invention, is now provided within single DLL 36. DLL 36 includes a router component 38, business component 40, HTML output component 42, and HTML forwarding component 44. Business logic for the routing component 38, application component 40 and HTML output component 42 is stored within the single DLL 34 instead of being stored in each associated component. Business component 40, in this example, includes separate processes "Respond To Homepage" process 40a, "Respond To Select Application" process 40b, and "Respond To Customer Details" process 40c, discussed in further detail below. The software outputs the final HTML output to the client browser 30 at final HTML output component 46.

As explained below, another aspect of the present invention allows a user with little to no programming experience to define an application, which is a collection of business processes related to each other, to achieve a complete business objective. The output of the user's actions is an "application file" such as application file 40, containing all information required to execute the application. Using the deployment method of the present invention, part of the application file, along with some other required information, is passed to the DLL. The DLL then executes the application and necessary processes and returns back with the application result.

For example, the present invention could run a "Shipment" application that has a number of business processes that can run independently of each other, including:
1. Receive a shipment order
2. Check for availability of requested items
3. Confirm shipment mode
. . . etc.

In accordance with a preferred embodiment, the first page shown to the user's browser is an HTML page that shows a welcome message. This page has within it two hidden controls (fields or data areas). One hidden control stores the path of the application file to be executed and the other hidden control stores the screen name that uniquely identifies the present screen. For the default page, the values for these hidden controls are hard coded.

The welcome page does not have any input controls and shows a "Continue" button. When the user clicks on the Continue button, a call is made to the DLL. The DLL uses values of the hidden controls, i.e., the path of the application file and screen name, to determine from which application and screen the message is coming from and identifies the correct application file and process within that file to use to handle the message. The DLL applies the business logic as dictated by the process, composes an HTML reply to be sent to the client's browser, populates the hidden controls in the new HTML output and forwards it to the ASP layer. The HTML output is sent back as response to the user's request by the ASP layer. In this case, the ASP layer acts only as a blind pass-through mechanism, with no knowledge about what the HTML being sent to the user contains.

The next page that is shown to the user could contain some input parameters requiring the user to fill in some values. This page will also contain the same hidden controls as the default page, only this time these controls will not be hard coded, but will contain values populated by the DLL. After the user fills in values into the input controls and clicks on Continue button, a call is made to the DLL. Information contained in the hidden controls as well as any inputs provided by the user, is sent to the DLL. The DLL executes the application specified by the application path and generates an HTML output. Again, the HTML output is sent back to the user as response. This process of showing the user pages for some data entry, calling the DLL with the user entered information (and hidden controls), and returning back with the HTML generated by the DLL is repeated until all inputs required to show the final result are received by the DLL. At that time, the HTML generated by the DLL is the final result to show to the client.

In the entire process, there is no need of writing any business logic or application specific logic into the Web server side code (ASP). All of the business logic and application specific logic resides within the DLL. Writing complicated Web server side code is now reduced to a simple call to the DLL, irrespective of the application being executed. Applications can hence be deployed much faster on the Web using the present invention.

Figure 4:
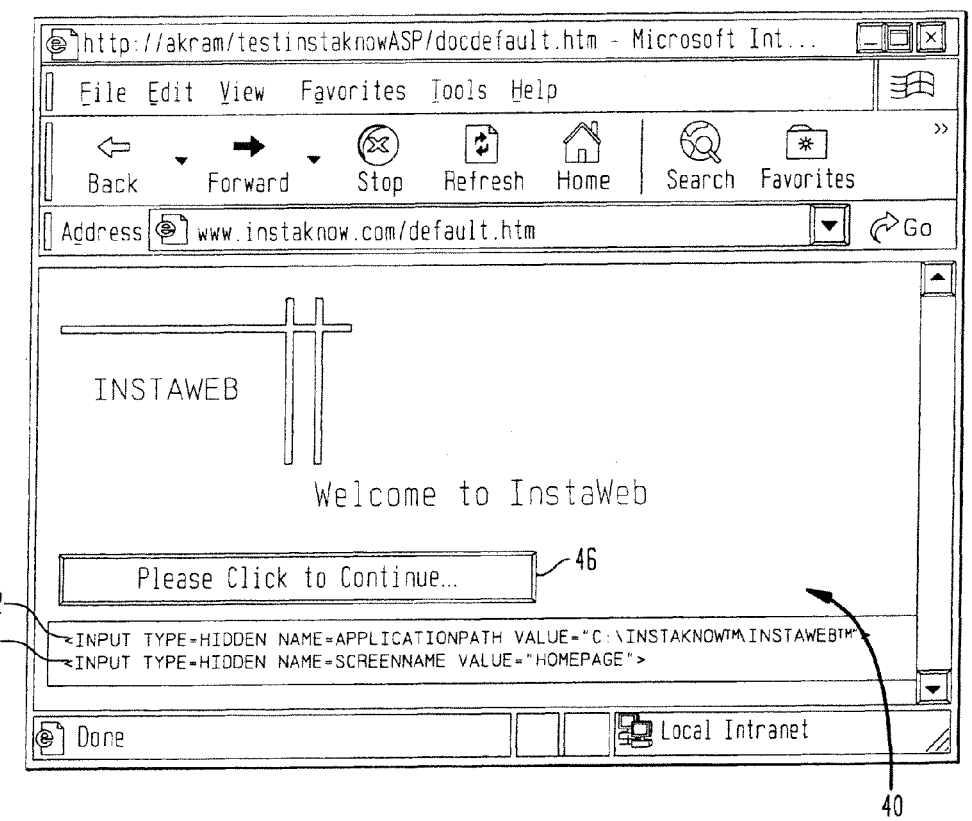
FIG. 4 is depiction of a default Web page showing otherwise hidden controls associated with such Web page.
Figure 5:
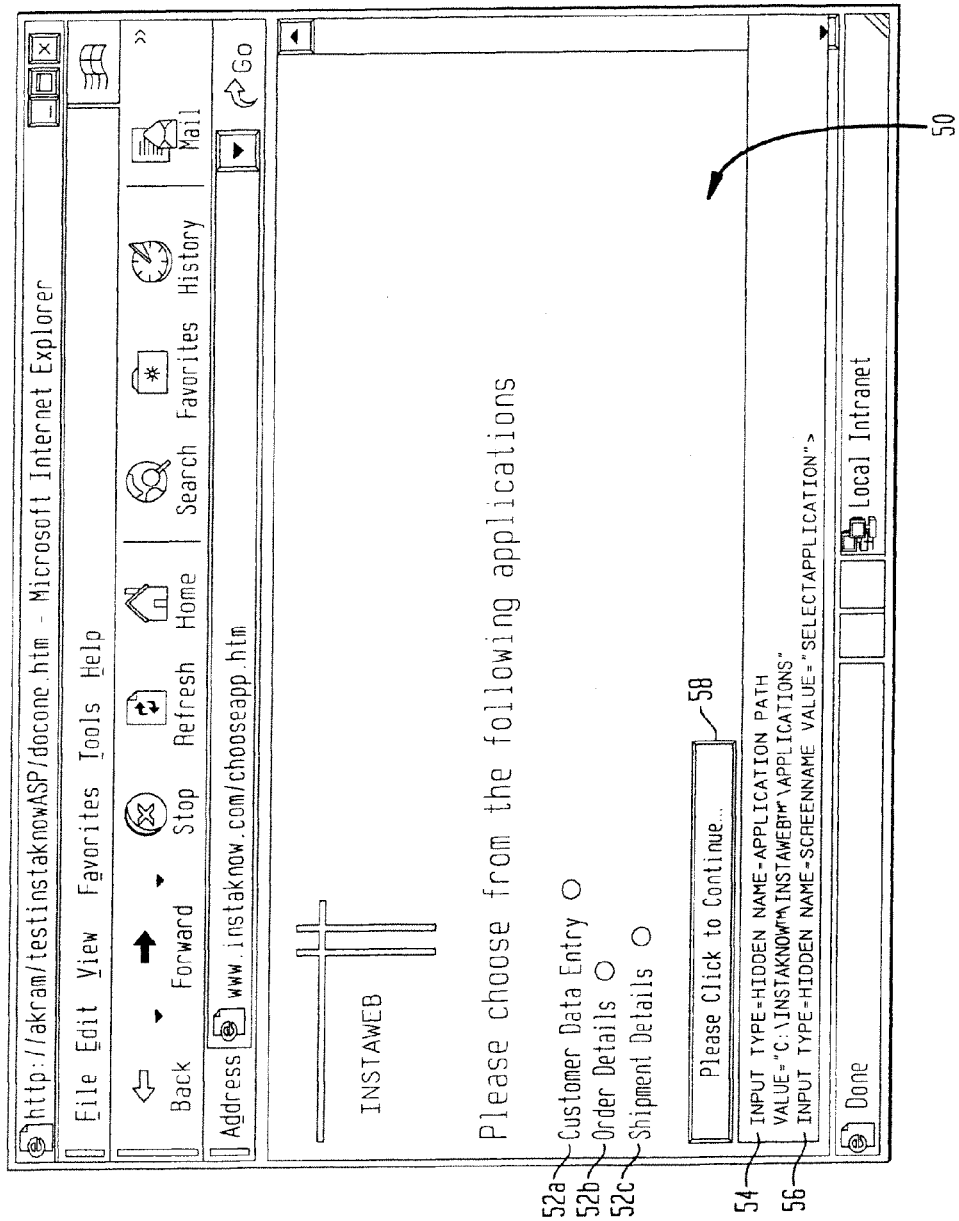
FIG. 5 is depiction of a select application Web page showing otherwise hidden controls associated with such Web page.
Figure 6:
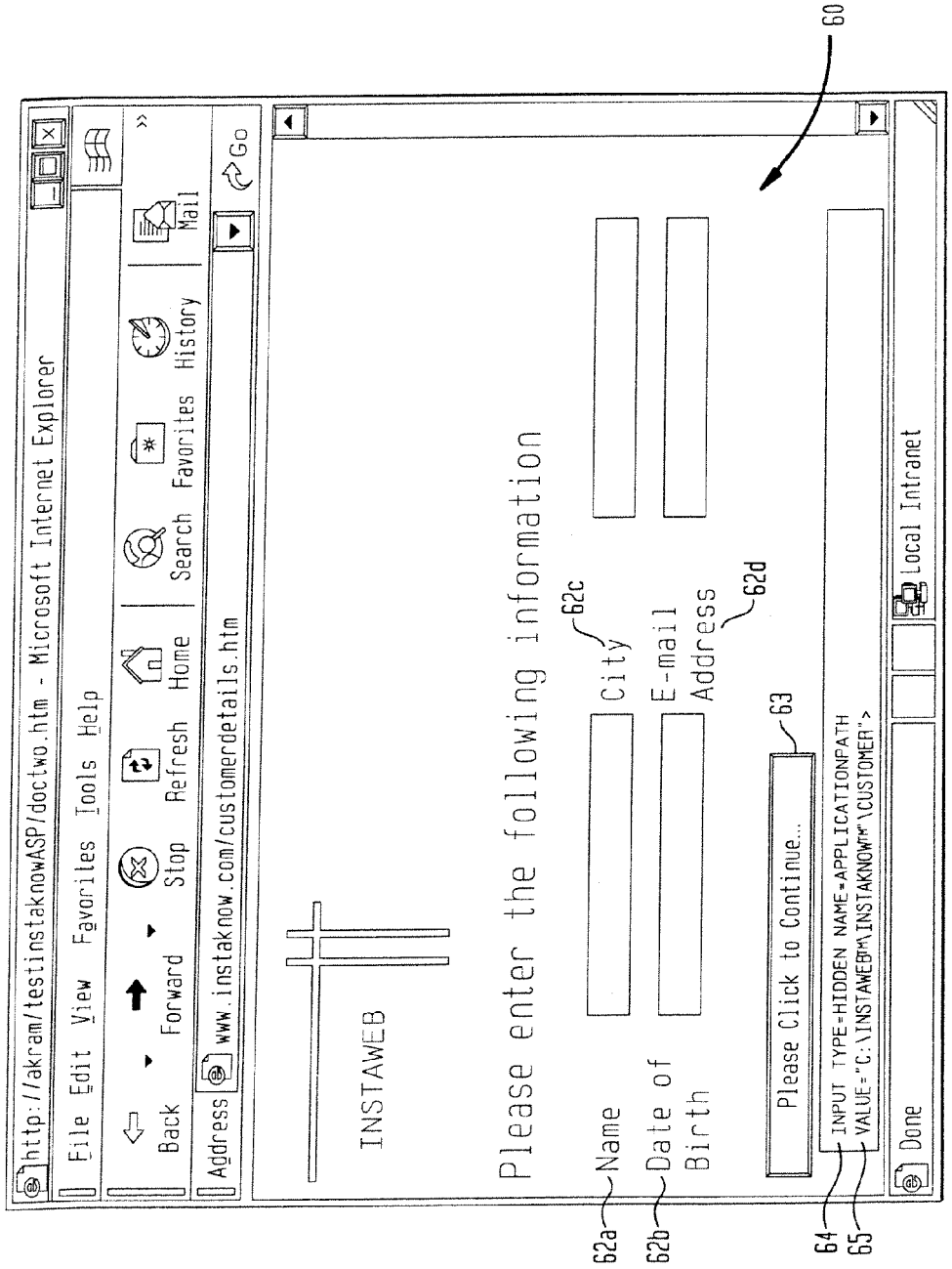
FIG. 6 is depiction of a user input Web page showing otherwise hidden controls associated with such Web page.
Figure 7:
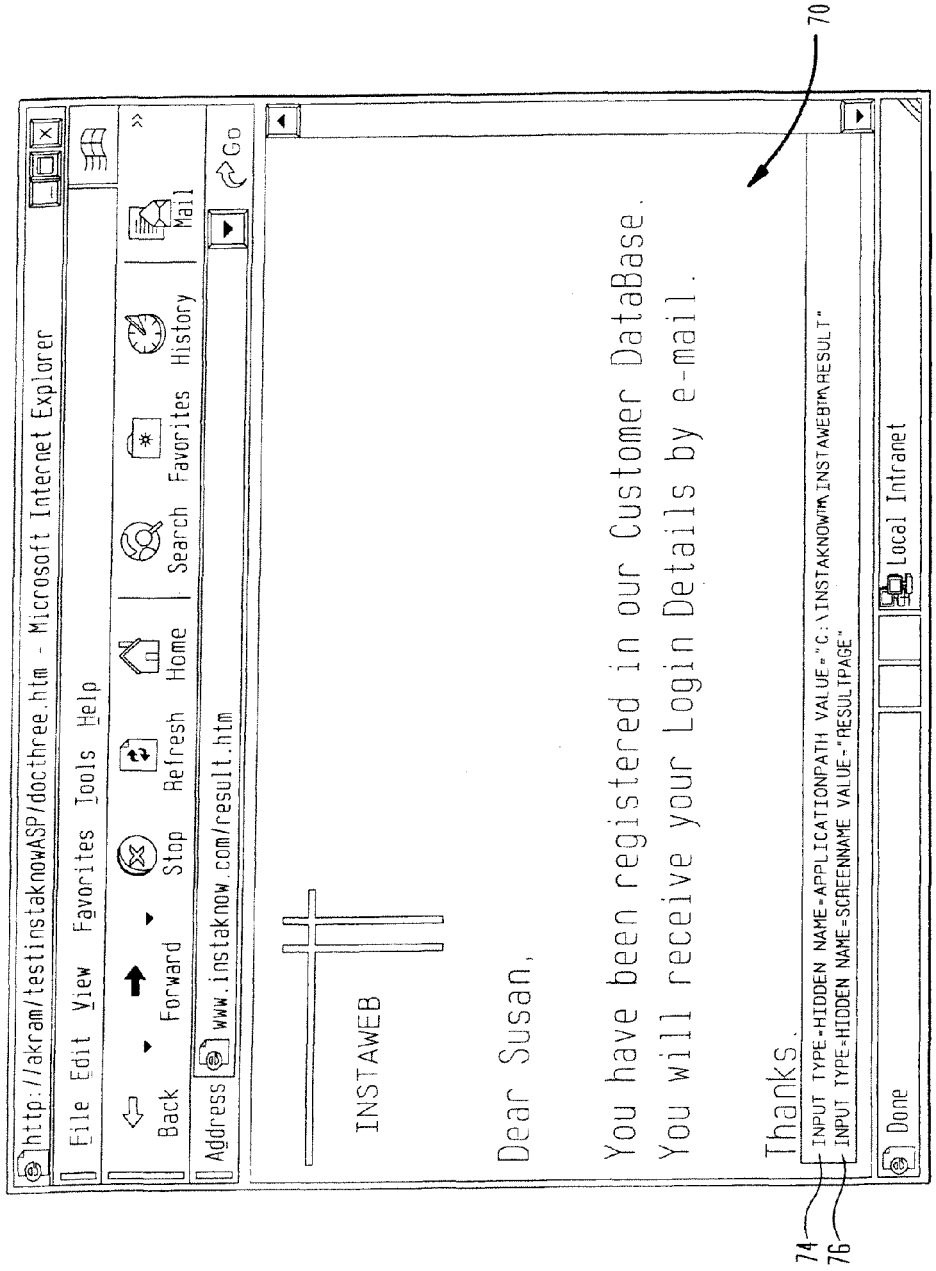
FIG. 7 is depiction of a results Web page showing otherwise hidden controls associated with such Web page.

As another example, a business user may want to build an application that shows a list of three applications to the user. The first is Customer Data Entry, the second is Order Details, and the third is Shipment Details. Each application has a different set of input requirements. As shown in FIG. 4, the first HTML page (the default page) that the user sees is the Welcome page 40. After that, as shown in FIG. 5, the user sees an HTML page 50 showing a list of applications 52a, 52b, and 52c to choose from. When the user selects any one application, on the next page 60, shown in FIG. 6, the user is prompted for inputs 62a, 62b, 62c, and 62d specific to the application chosen to run. After entering the required inputs, the application is executed and the user is shown the result on Web page 70, as shown in FIG. 7.

The first step is to define the application files for specified applications of Customer Data Entry 52a, Order Details 52b and Shipment Details 52c. This is done preferably using the other aspect of the present invention; namely the methodology for building applications using a programmer-less, point-and-click, business rules based system. Preferred software for implementing this aspect of the present invention is the design time version of InstaKnow™ software, offered by InstaKnow, Inc. of Edison, N.J. An example of the use of the business rules based application development aspect of the present invention is described below. Use of this aspect of the invention builds an application file, which generates the screen showing the list of applications to show to the user.

On the default HTML page (FIG. 4), the application file path hidden control 42 is initialized to point to the application file that generates the screen showing the list of applications to show to the user. Here, that application file is found at the address "C:\INSTAKNOW\INSTAWEB." The other hidden control, screen name 44, is given a unique screen name that is understood by the DLL. Here, that name is "HOMEPAGE." The DLL has business logic within it to perform various functions depending on the incoming screen name.

When the user logs on to the Web site, he or she is shown the default HTML page 40, and hidden controls 42 and 44 are hard coded on this page. When the user clicks on the Continue link 46, a call is made to the DLL resident on the Web server computer. At this stage, there is no input information being entered by the user on welcome page 40 so only the information contained in the hidden controls is passed to the DLL.

The DLL then executes the application identified by the application file path, performs any business logic depending on the incoming screen name, and generates an HTML output to send back to the user. Psuedo-code specifying this process is as follows:

```
If ScreenName = "HomePage"
    Call Process RespondToHomePage
Else If ScreenName = "SelectApplication"
    Call Process RespondToSelectApplication
Else If ScreenName = "CustomerDetails"
    Call Process RespondToCustomerDetails
...
...
End If
```

Psuedo-code for processing the RespondToHomePage application, is as follows:

```
Process RespondToHomePage
    Show appropriate controls on next page
    Populate hidden controls
    Generate HTML for next screen
End Process
```

For the example, the HTML generated by the DLL will show the user the list of applications to choose from, as shown in FIG. 5. This HTML will also make sure that the hidden controls 54 and 56 are populated with appropriate values.

Suppose that the user selects Customer Data Entry 52a and clicks on Continue 58. The DLL is called again. This time, information contained in the hidden controls 54 and 56, as well as user entered information (selection of Customer Data Entry application) is passed to the DLL. The DLL executes the application and generates the HTML output to show to the user a page 60 (FIG. 6), asking for specific information for Customer Data Entry.

The user is then shown page 60 requesting input specific to the Customer Data Entry. For this example, the user enters information in the fields Name 62a, Date of Birth 62b, City 62c, and E-mail address 62d. When the user clicks on Continue 63, the DLL is again called with information entered by the user and the hidden controls 64 and 65. The DLL executes the application and returns back with the result Web page 70 (FIG. 7), which also contains hidden controls 74 and 76.

With this aspect of the present invention, all of the business logic, including the logic required to get the request from the Web browser, run the appropriate application logic, and construct an HTML output is kept inside the DLL only. The ASP layer is blind and therefore used only to forward HTML generated by the DLL to the Web browser at process 44. This approach is possible because the present invention has the ability to (1) route messages from the Web browser to a correct process within the DLL and (2) generate the HTML output. In effect, the present invention is an alternative to ASP in both regards. To route to the correct process within the DLL, three hidden parameters are obtained from the HTML output generated by the DLL. These parameters include (1) the screen name, (2) the application file (IAL) name, and (3) the clicked element, which is on the HTML page. With the combination of these three parameters, the program checks the router process and routes the logic control to the appropriate process within the DLL.

The above aspect of the present invention results in the benefit in that one does not need to learn ASP to deploy Web based applications. Another aspect of the present invention provides the business logic portion to be implemented using a user-friendly, wizard-based point and click programming tool interface, such as via the use of the software program InstaKnow™, such that the business logic required for the routing, processing and HTML generation of any application can be specified by a business user without needing a computer programmer to write the code.

This application development aspect of the invention allows a business user to make customized Web and non-Web applications using a point-and-click protocol and without needing a programmer or knowledge of any programming language. All the user needs to know is the business data and its business meaning and the business processes (i.e., a particular sequence of operations on the data) that operate on that data to achieve the required business result.

In today's business world, the advantages of programmer-less, point-and-click, user driven application generation are obvious. With the present invention, users do not have to wait for weeks and months to get applications built, and they can build them themselves. The invention also has a unique ability of "automatic surfing," i.e., automatically, enter data on Web pages, press buttons and links, get the response from the Web site and read data of interest to take further automated actions.

The invention is preferably in the form of software providing a point-and-click approach and wizard-based interface and assumes and requires no programming expertise among business users. The user just has to know in simple ways what manipulations have to be applied to the business data to achieve the required results. A user interface guides the user from that point on using a set of intelligent wizards. The wizards make sure that the complete and correct information about the user's intent for every step is correctly captured and saved. The applications built can be tried out and tested immediately without having to know technical details. Because of the automated assistance provided by the wizards, it is estimated that the users can build applications in much less time than it takes programmers of conventional languages to build the same applications.

The application development software of the present invention is not specific to any industry or computing problem. It can be used to easily develop simple or complex applications in any industry. As an example, a user can easily develop an application within a couple of days that will go to Web sites of its various supply vendors, collect spare part specific information, perform logical and mathematical operations on the data, decide which vendor gets the contract, inform the vendor, and place an order for a certain quantity of spare parts over the Internet.

The software allows users to access and operate on real time data elements from various data sources. Data can be extracted from the Web (Internet and Intranets) from HTML or XML pages, and ODBC compliant data sources like fixed format flat files, delimited flat files, Excel, Word, Access, SQL Server, Oracle, Sybase and any other ODBC compliant databases. Another feature of the application development software is the ability to transfer not only data but also business logic over the Internet between collaborating computers.

Preferably, the application development software has built-in facilities for version control, security/permissions control and migration control, and can run on any 32-bit Microsoft platform on a client desktop or a LAN/Web server. In the Web server mode, high-end scalability can be ensured by deploying it as a business object component in Microsoft Transaction Server (MTS). A built-in scheduler is also preferred to allow repeated automatic executions of same business processes at user specified frequencies.

There are three main phases of the user's interaction with the application development software's point and click environment. These include a Design Phase, a Playback (Debug) Phase and a Run Phase. The Design Phase is where the user defines the business logic. The Playback (Debug) Phase is where the user can try out the business logic immediately. The user may start/stop the business logic after each step for verification (debugging) purposes. A watch mode allows monitoring data values of interest as the business process is being verified. At the Run Phase, after being satisfied that the logic is working correctly, the user can schedule the business logic to run automatically at pre-determined frequencies, including on demand. In the run phase, the logic runs automatically without any user intervention.

Supported 'actions' (also called 'verbs') are:

Accept: If the process, when it runs, needs to get some business information from the end user, the application designer uses the 'Accept' verb to halt the program and prompt the end user for appropriate information. The user-supplied value, after designer specified validations, is stored in the data element specified by the designer.

Assign: An assign is a transfer of the current value stored in one data element of a group to the other data element in another group. The new data element must have been defined earlier, and should be a part of a group that already exists. Assign works on an entire group, i.e. all the data elements in the new group will be assigned the current values in the associated data elements from the assigner group.

In our example, one process reads information from the web for a particular stock symbol, and stores that information in data elements in a data group (let's say Group A). The data elements in Group A will be overwritten with new information for every stock symbol read. Before that happens, the designer 'Assigns' the data elements from Group A to data elements of another group (Say Group B). This will ensure that data element values from Group A is now safely stored in data elements of Group B, and data elements of Group A are ready again to accept information for the new stock symbol.

Call: A call verb is used to temporarily halt the current process, execute another (called) process and return to the calling process. The process being called must have been defined earlier, and be a part of the application within which it is being called. Let's say that we are executing statements in one process (P1), and need additional information that the present process can not supply. And say we have another process (P2) that does the job that process P1 needs to get done. The designer achieves this by making a 'Call' to the other process P2 from process P1 at an appropriate step in the process P1.

Chart: A chart is a graphical representation of data from a single group. Suppose if the designer wants to create a pie chart of portfolio summary, he/she supplies the group that holds the portfolio information to the mechanism that creates a chart. The charting mechanism then rearranges the data in a graphical fashion, just like any another chart usually seen in applications like Excel etc.

Clone: The 'Clone' verb creates a duplicate copy of a selected data group. The original group, whose identical copy is to be created, should be already present. This verb is a shortcut to the manual steps of defining a similar looking group from scratch and doing an assign of the data from another group.

Compare: The verb 'Compare' compares the current values stored in every row of one group to the current values stored in the rows elements of another group. The comparison is based on the keys defined on both the group data elements. Actions to be taken in following situations can be specified:

Keys are exactly matched between left side group and right side group

Excess data is found in left side group

Excess data is found in right side group

Condition: The condition verb allows the designer to specify a true or false check on combination of individual comparison (=, >, <, not, and, or) checks. This is the equivalent of a 'IF . . . ELSE . . . ' statement in a conventional programming language. The wizard displays available data groups, data elements, mathematical operators, logical operators, and trigonometric functions to help the designer define a condition. Other designer specified actions are conditionally executed depending upon the True or False outcome of the condition check.

Display: The Display verb prepares a HTML file output showing data from designer specified groups. The display wizard has numerous options to customize the appearance of the output. This includes putting headers and footers in every group's data display, putting logos, changing fonts, character sizes, colors, backgrounds etc. If specified by the designer, Display can also show breaks in the report on specified columns and show grand totals. In addition to sums, minimum, maximum, average values can also be shown.

Edit: Edit allows making changes to the characteristics of an existing data element. The Group and the data element have to be selected and identified before it can be edited. Suppose a data element E1 held only 8 characters and our requirement now is to allow 16 characters in data element E1, then the designer can invoke the 'Edit' command, select the data element E1, and make changes on the 'Edit-Wizard' so that data element E1 accepts 16 characters thereafter.

Extract: Extract verb brings up a wizard that allows users to define the data elements that will receive data that is extracted from other data sources. The data can be extracted from the web, XML, and ODBC compliant data sources like Excel, Word, Access, SQL Server, Oracle, Sybase etc.

Insert into Excel: Inserts a selected Group data elements into a selected excel file. The current values in the data elements of a data group can be either be appended to existing data in the excel file, or can be added as new data to the file.

Although Loop: A loop is repetition of specified verbs until a condition is satisfied. The wizard displays groups, data elements, mathematical operators, logical operators, and trigonometric functions to define a condition. The application repeats the processes that are associated with the condition, until the condition is satisfied. In our example, the designer said that 'Loop' the process of data extraction from the web for every stock symbol in the input excel file until all the stock symbols from the excel file have been read.

Mode: A mode is a fashion in which the InstaKnow™ application will be used. There are four modes in InstaKnow™: Application; Process; Data; Program. Depending on which mode button is selected, the 'Verbs' change to reflect the mode selected, and presents the verbs associated with the action selected. For Example if 'Data' was clicked, the designer is presented with four (4) buttons representing four (4) verbs like Clone, Data, Delete, and Edit. This allows the designer to perform all operations related to the data elements.

Position: This verb tells the program to move to a specific record in a selected group. In our example, the stock symbol is read one by one from the excel file. After one stock symbol is read, the process that reads the stock symbols has to be instructed that now it has to read the next symbol. This is achieved by inserting a statement in the application that 'moves' the current row pointer to the next record so that the next stock symbol will be read.

Save As: This verb is used to save the information from a data group into a permanent storage location like an Excel file, flat file or an XML file.

Save As Excel: Saves a selected Group data in a new excel file. In our example, for every stock symbol read from the excel file, the application retrieves information, and stores it in data elements of a data group. The information from this data group is written out to a new excel file.

Set: Set verb allows a designer to assign a value to a single data element. The value assigned can come from another data variable, or an expression, or can be a constant value.

Sort: The function of this verb is to rearrange the order of data in a group based on the order (ascending/descending) specified for one or more elements within the group.

An example of the use of the application development software is now described in the context of obtaining data from the Web and saving it into a spreadsheet. In this example, there is a list of stocks in a Microsoft Excel spreadsheet and the user wishes to retrieve and save the latest stock price and trade volume information for the whole list from the Web and then save it in another Excel spreadsheet. To achieve this business result, the following data manipulation steps have to be applied:

Read list of users stocks from input spreadsheet

Go to the MSN Investor Web page Start from top of the list

Get the current item from the list, and loop until last stock in the list

Enter the stock symbol from the list into the stock symbol on the MSN Investor Web page. Press Get Quote button on Web page.

When the Web server responds, get the current stock price, volume, etc. from Web page Copy this information to the same numbered item in another (output) list
Get the next item in input list
Repeat the loop
Save the output list in another spreadsheet Within the wizard-based-programming environment, the information about all the groups, data elements, and processes is always available once they have been defined. This information is arranged in a fashion that will facilitate the meaningful information exchange between the individually defined pieces, and produce a desired result.

The following describes how an application is built from the various components like data elements, groups, processes, and applications. The design phase is where the user defines his intent of what should occur to the business data of interest. The user selects the next action to be performed from a list of available actions.

In the example of getting stock prices and saving them in another spreadsheet, the actions performed are:
Accept user input
Read
Go to Web site
Start from top
Loop until no more items in list
Enter on Web site
Get information from Web page
Copy data
Get next item in list
Repeat loop
Save
Check if asked to display the result
Display the result (if asked to)

Figure 8:
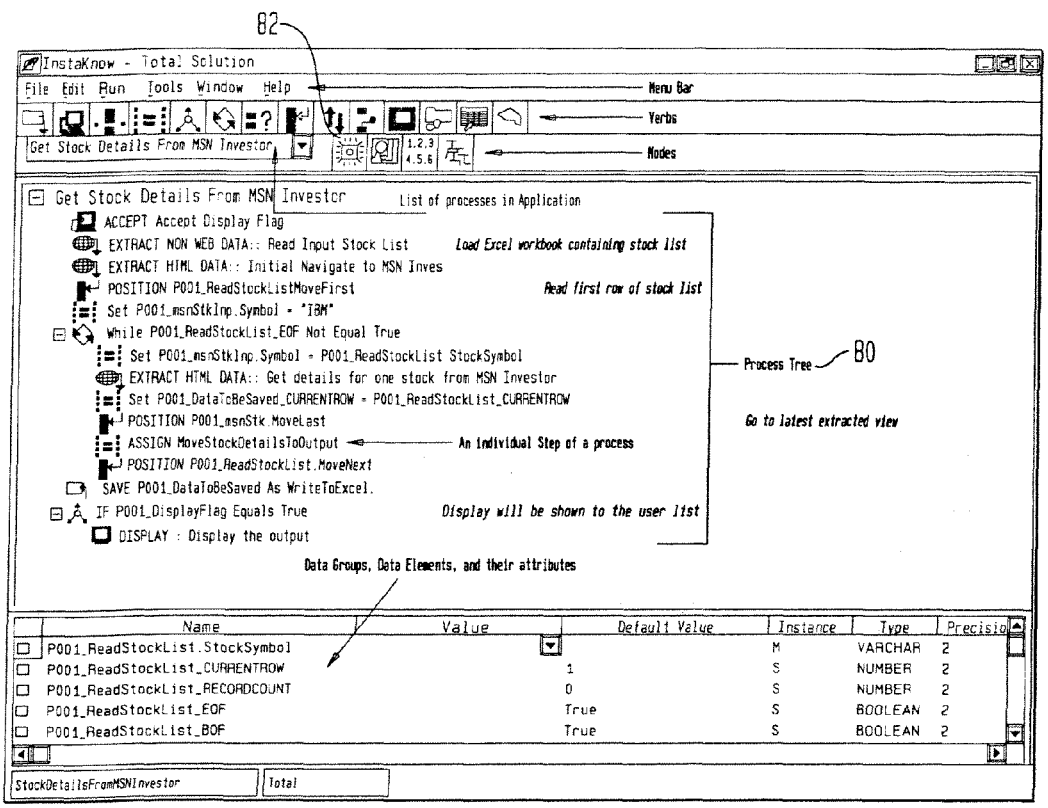
FIG. 8 is a depiction of a main screen of a user-interface of a program implementing the present invention.
Figure 9:
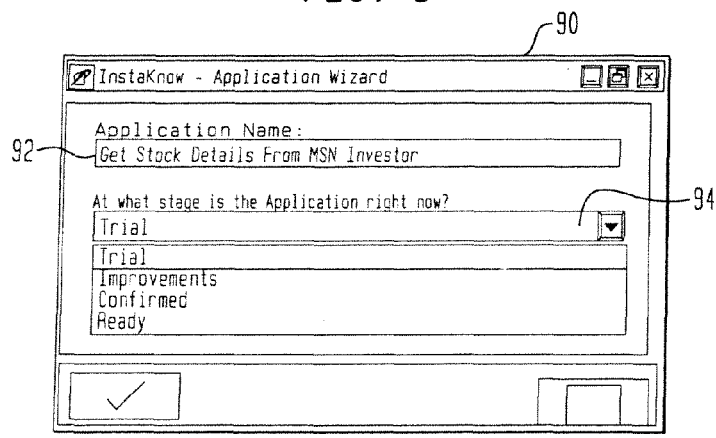
FIG. 9 is a depiction of a screen in the Application Wizard of the program.

The wizard-based programming interface guides the user from that point on as a set of intelligent wizards. The wizards make sure that the complete and correct information about the user's intent for every step is correctly captured and saved. As shown in FIG. 8, a user specified "process tree" 80 is shown to the user for easy visual identification of what steps have been specified so far.

The first step in the design of the application is to assign a name to the application. To do so, the designer clicks the Application button 82 to bring up the Application Wizard. The Application Name 92 is entered in the Wizard, and the stage of the application is specified at drop down box 94.

Figure 10:
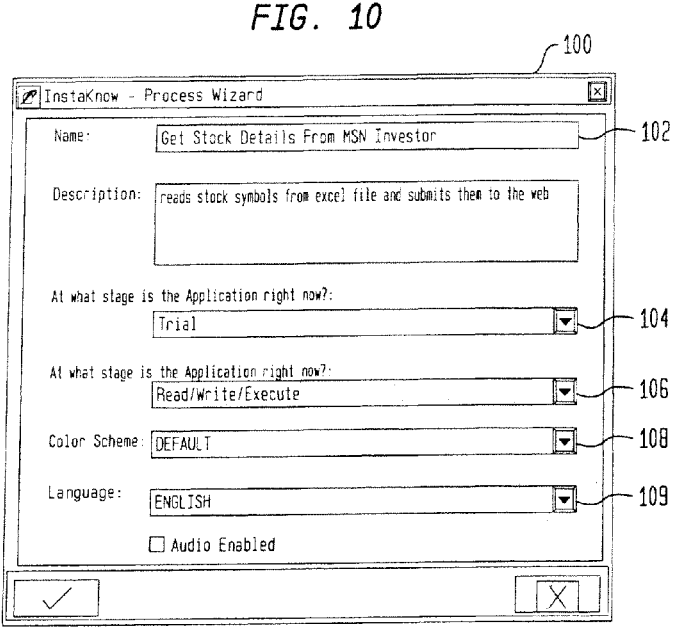
FIG. 10 is a depiction of a screen in the Process Wizard of the program.

The next step is to define a process by which the application will be identified, using Process Wizard 100 (FIG. 10). The Name 102 for this process is as it appears on the screen in the design environment. The stage 104 of the application also is identified as before. If the designer is about to build a new process, Trial stage can be selected so that the designer can make changes during the process configuration as many times as needed.

The next field on the Process Wizard 100 is the permissions 106 to use this application. The read/write/execute permission will allow any other user to edit the design of this process. For tighter security, the designer can opt for a Read/Execute type of permission only. The next fields are the color scheme 108 and the language field 109. The designer can select the language in which the application will be built up. In this example the designer selected English as the language for application construction.

The first step under the process steps in the design of the above application is to ask the user if he/she wants to view the final output or not. This is achieved through the Accept verb. The web based programming such as InstaKnow, accomplishes complex programming tasks transparent to the user, by allowing the user to define a simple business action. This way, the user is least bothered with how to program the statement; while at the same time can construct logic in plain simple way. Intelligent wizards prompt the user to get complete and correct information about the user's business intent. The supported actions or verbs are specified for selection by the designer. For example, if the process, when it runs, needs to get some business information from the end user, the application designer uses the Accept verb to halt the program and prompt the end user for appropriate information. The user-supplied value, after designer specified validations, is stored in the data element specified by the designer. Preferred actions or verbs are those used by the InstaKnow software, which are listed under the Program Logic heading in U.S. Provisional Application 60/174,747, the disclosure of which is hereby incorporated by reference herein.

Figure 11:
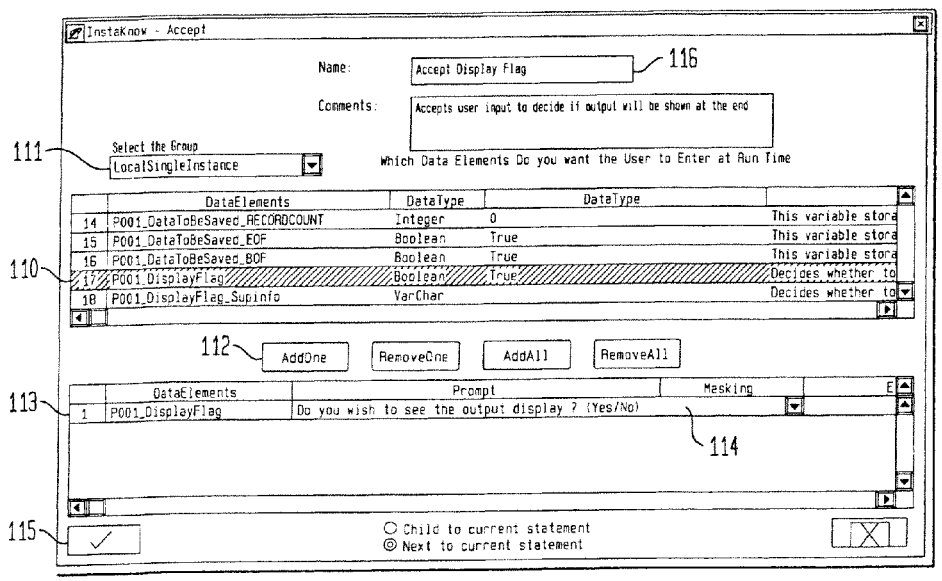
FIG. 11 is a depiction of a screen used to define a verb to be used with the program.

As shown in FIG. 11, the designer has defined a local variable called Display Flag 110 local to this process (P001_DisplayFlag). The designer gives a user-friendly name Accept Display Flag 116 to this accept step. Thereafter, the designer has to select a group from drop down box 111. The data element that the designer has defined does not belong to any of the groups. Also, it will be used within this process only, and occurs only one time in this process. Hence, the designer had categorized this data element as Local Single Instance. The designer selects "LocalSingleInstance" from the drop down box 111 of the "Select the Group." This fills up the grid below it with all the data elements that have been defined earlier as Local Single Instance. The designer highlights the desired data variable 110 and adds it to the bottom most grids using the Add One button 112. In this example, the data element, P001_DisplayFlag 113 is chosen from the upper grid and displayed in the lower grid. The designer has to provide a message 114 that will be used to prompt to the user of this application. The designer wants to ask the user here whether he/she is interested in viewing the final output. Therefore he/she puts prompt 114 as "Do you wish to see the output display? (Yes/No)." This completes the design of an Accept verb. The designer clicks the OK or check button 115, and the Accept statement is added to the application in the designer environment.

Figure 12:
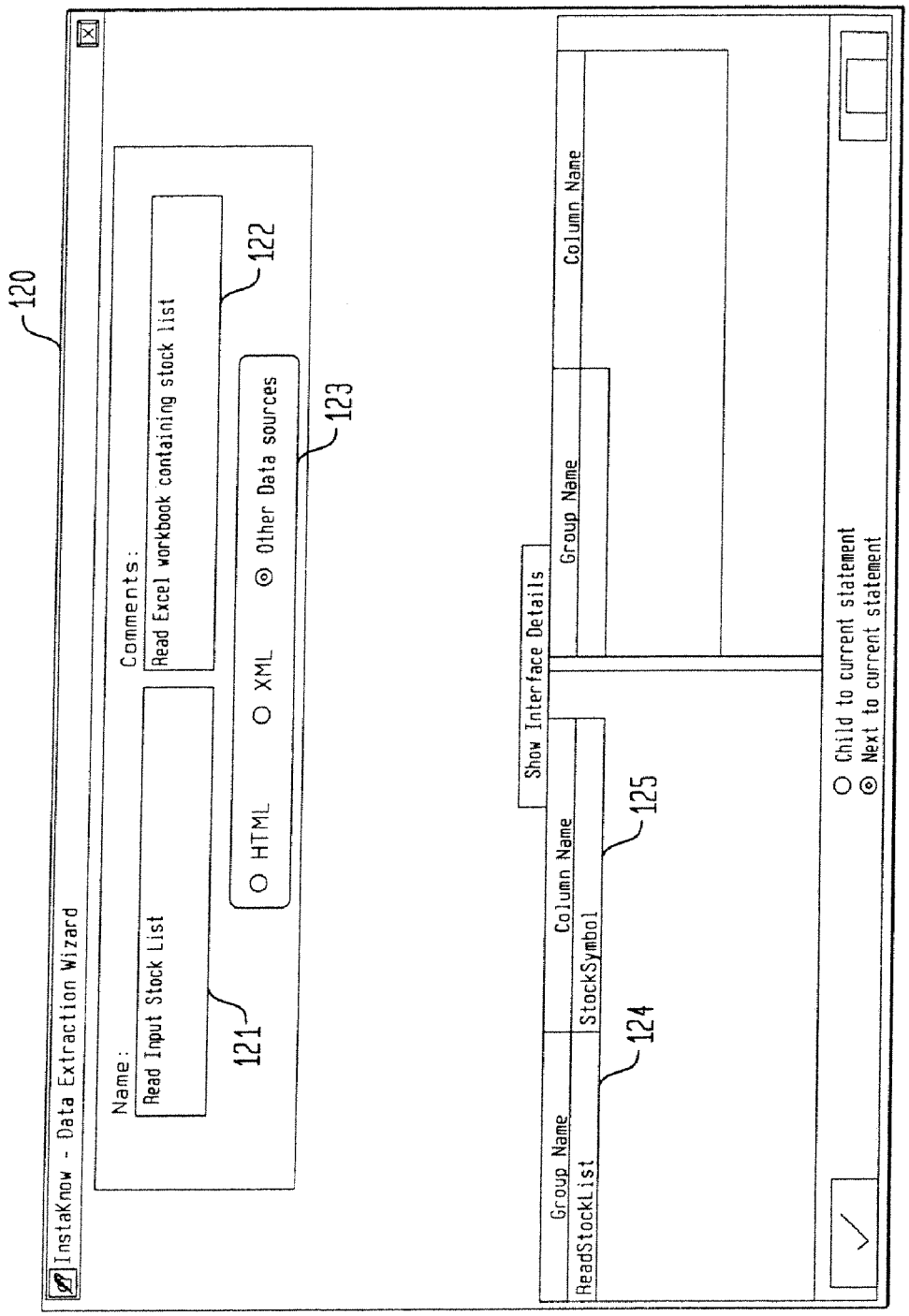
FIG. 12 is a depiction of a screen in the Data Extraction Wizard of the program.

In step 2, the designer wants to extract non-Web data by opening an existing Excel file to read the list of stock symbols it contains. The read of Excel file is an Extract Data type of operation, which falls under the Program mode. The user clicks the Program mode to access the Extract verb. The click on extract button brings up the Extract Data Wizard 120 (shown in FIG. 12).

Figure 13:
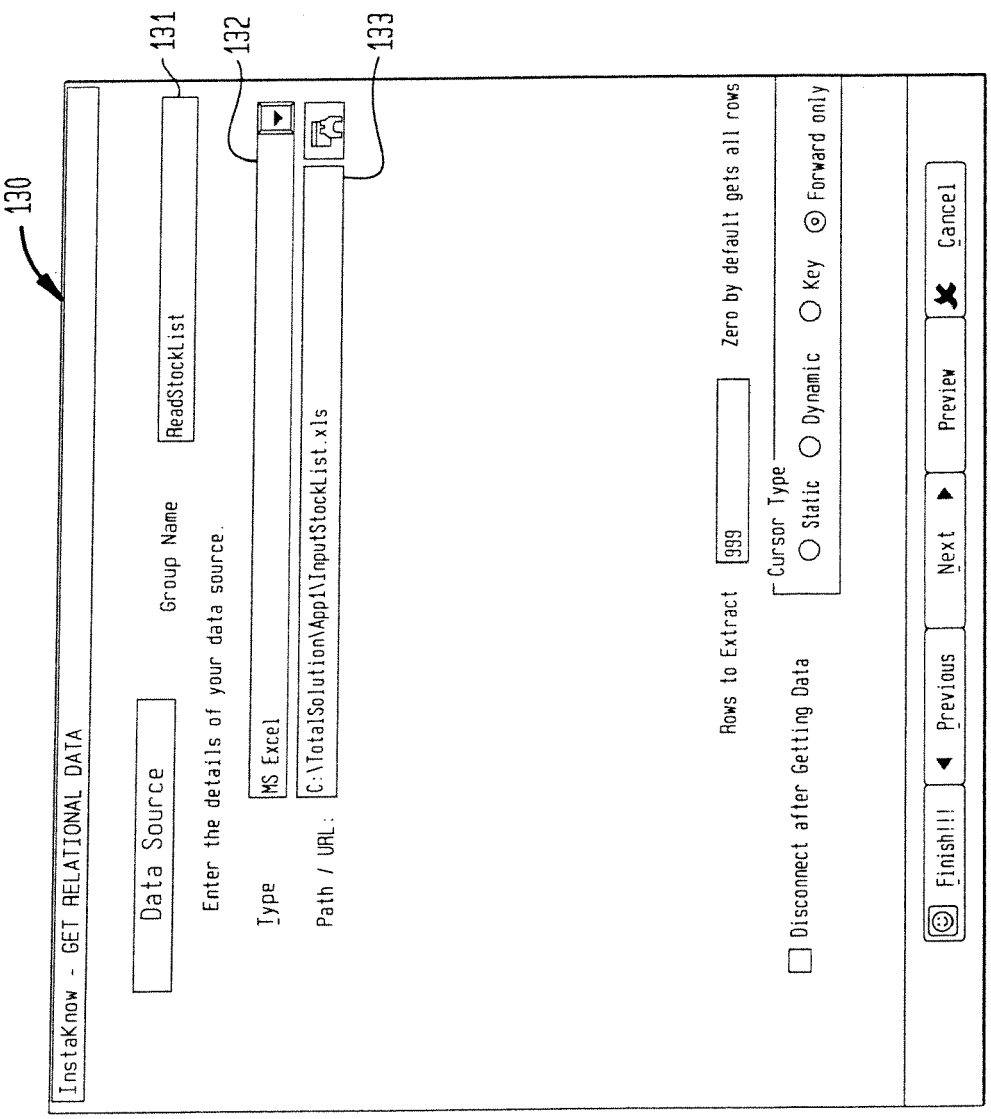
FIG. 13 is a depiction of a screen in the Get Relational Data Wizard of the program.

The designer must then define the data source. To do so, the designer supplies a name 121 to this extract procedure, and user-friendly comments 122. Thereafter the designer decides from where the data will be extracted. In this case, the data is to be extracted from an Excel file, which falls under the Other Data Sources category 123. A click on this button brings up the next Wizard 130 (FIG. 13) that will assist in extracting information from Excel files.

The designer provides a group name 131 by which the extracted list of stock symbols will be recognized, then selects the data type 132, which is Microsoft Excel, and the path 133 to the location of the file, which on the C drive.

Figure 14:
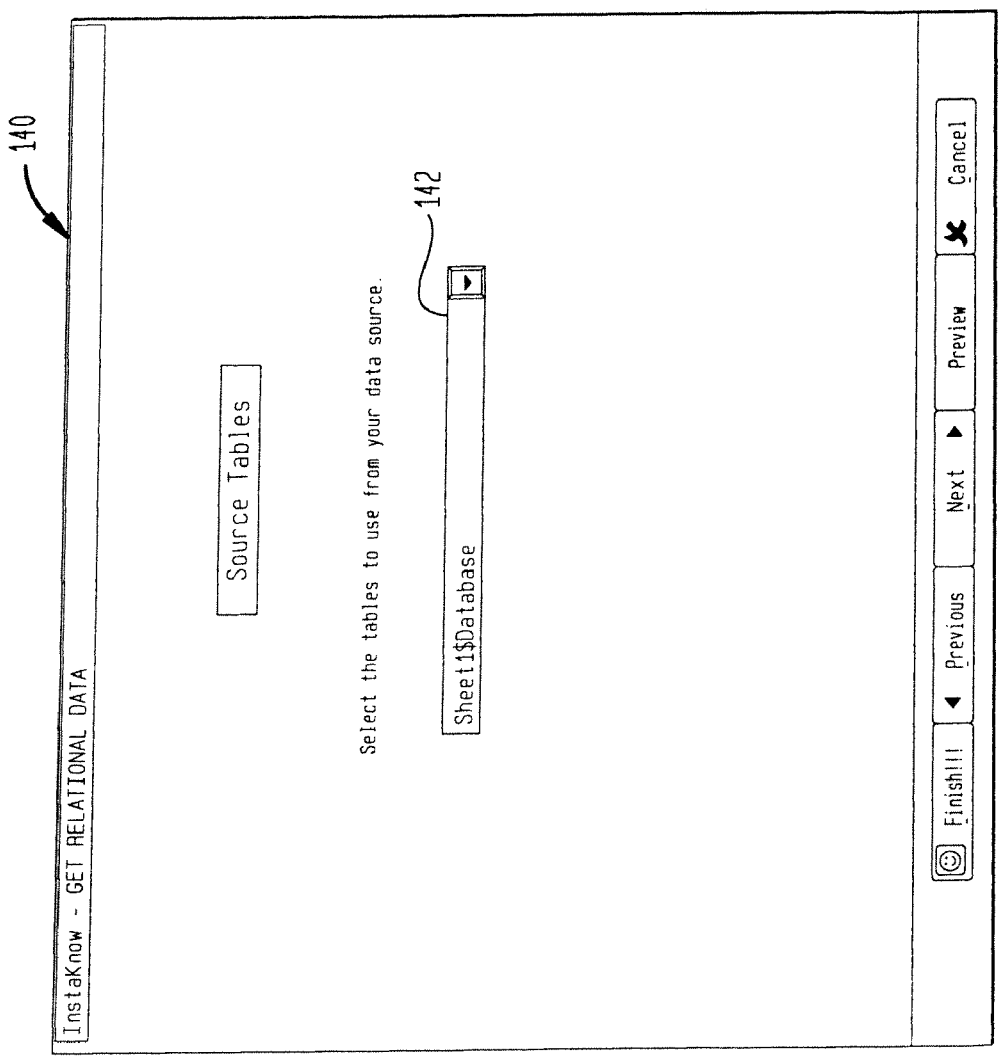
FIG. 14 is a depiction of another screen in the Get Relational Data Wizard of the program.

The file is opened and information in it is read, and saved as database. The databases read are presented for selection in the next wizard step 140 (FIG. 14). In this example, the data is present in an Excel worksheet called Sheet 1. Hence, the information from this Excel workbook is read as Sheet1$Database 142.

Figure 15:
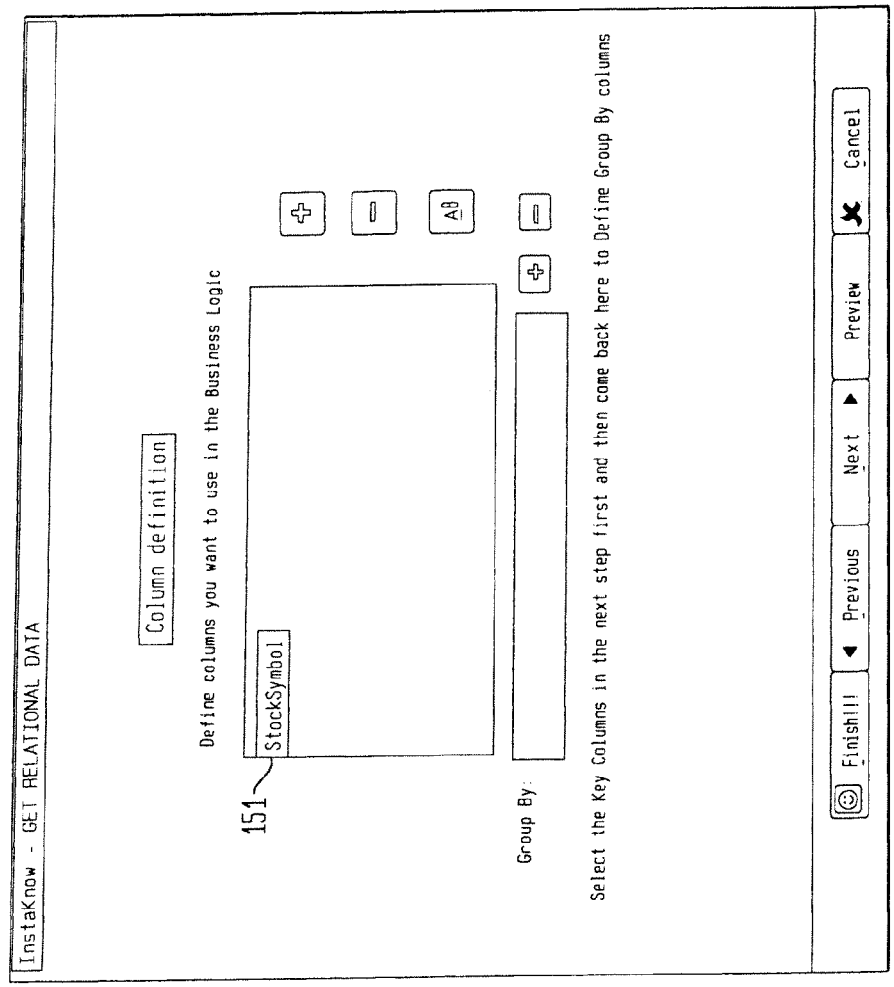
FIG. 15 is a depiction of a further screen in the Get Relational Data Wizard of the program.

In the next wizard step, shown in FIG. 15, the user is shown the columns listed in the Selected spreadsheet database. In this case, there is only one column named StockSymbol 151. This column has all the stock symbols listed under it.

Figure 16:
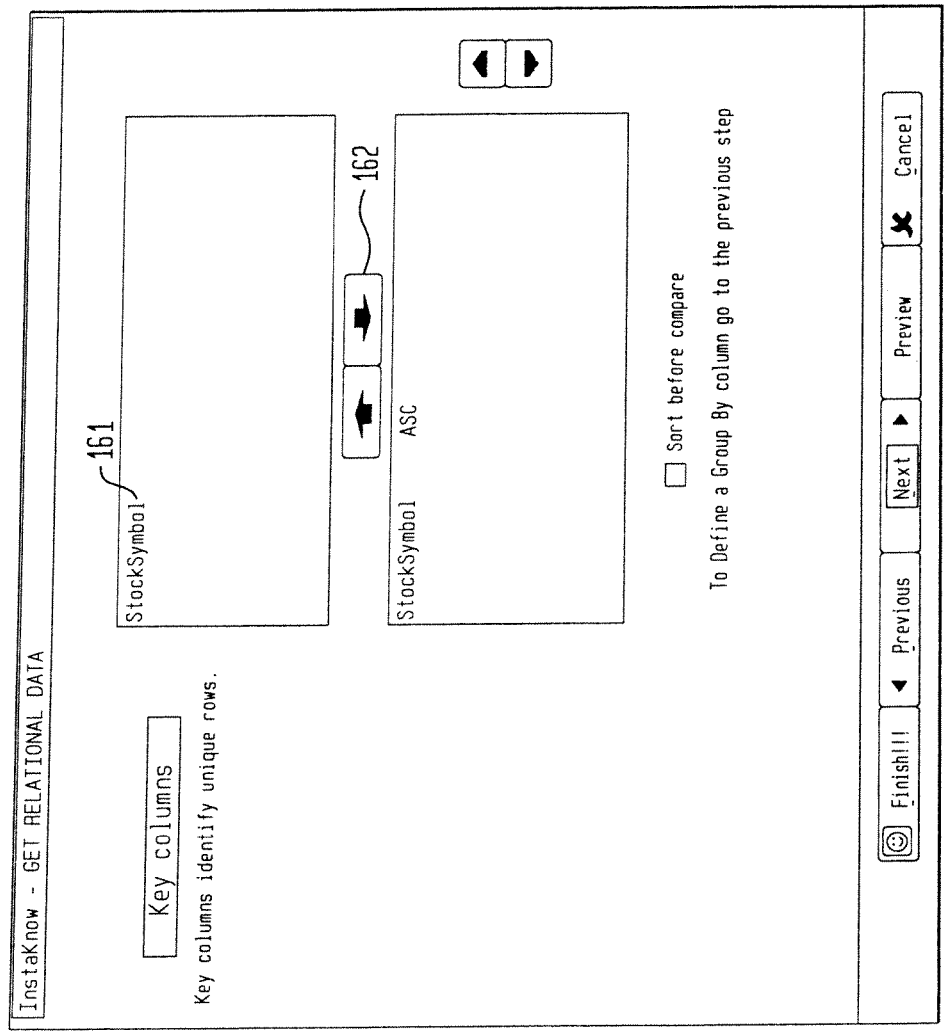
FIG. 16 is another screen in the get Relational Data Wizard of the program.

Next in the Wizard, as shown in FIG. 16, the user defines primary key columns on the table. A table usually has a column or combination of columns whose values uniquely identify each row in the table. This column (or columns) is called the primary key of the table. The column StockSymbol 161 is selected as the primary key, an added to the lower frame 163 using transfer arrows 162.

Figure 17:
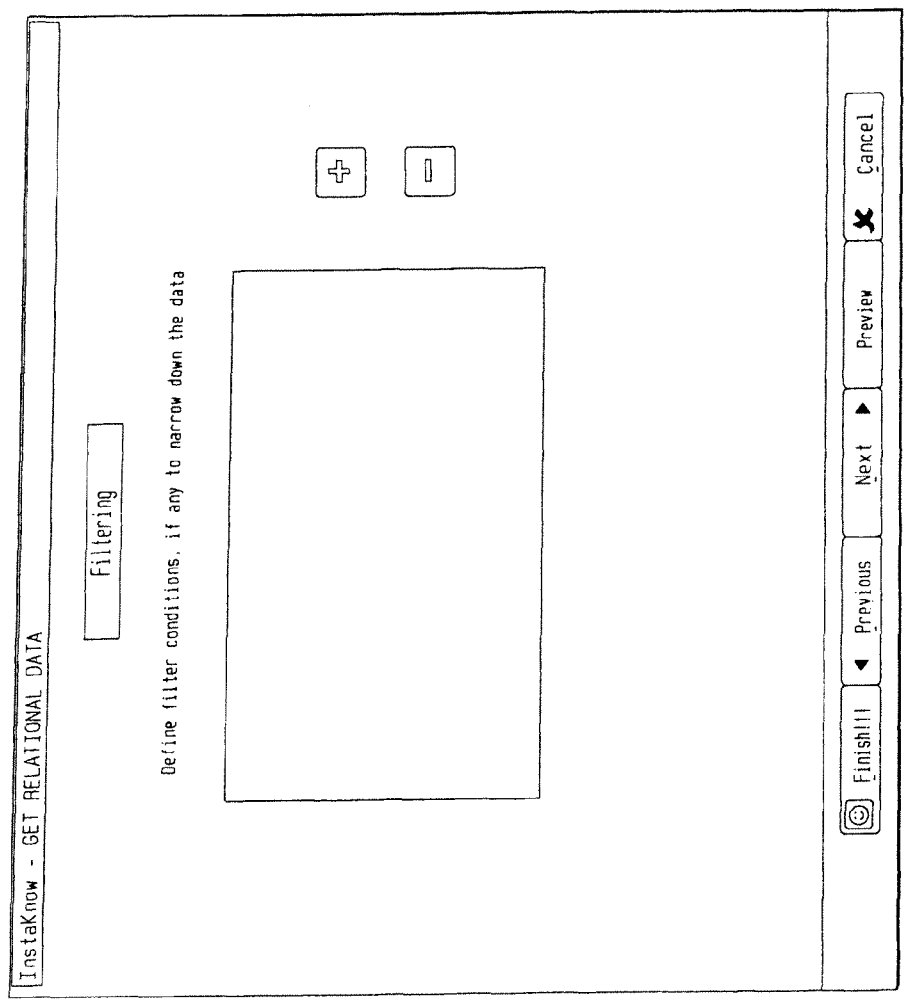
FIG. 17 is another screen in the Get Relational Data Wizard of the program.

Next, an option to filter out unwanted data is available to the designer to prune the selection of stock symbols, as shown in FIG. 17. For instance, the stock-symbol list had 2000 symbols and the designer was interested only in the symbols starting with 'A', he would have defined a filtering condition based on 'A' that would have filtered out all other symbols but the ones starting with 'A'. In this example, all input stock symbols are used.

This then completes the definition of the data to be extracted. The group name given to this data i.e., ReadStockList 131 (FIG. 13), and the column name, i.e., StockSymbol 151 (FIG. 15) appears in the starting Data Extraction Wizard form 120 (FIG. 12) at GroupName 124 and GroupName 125 for data extraction.

Figure 19:
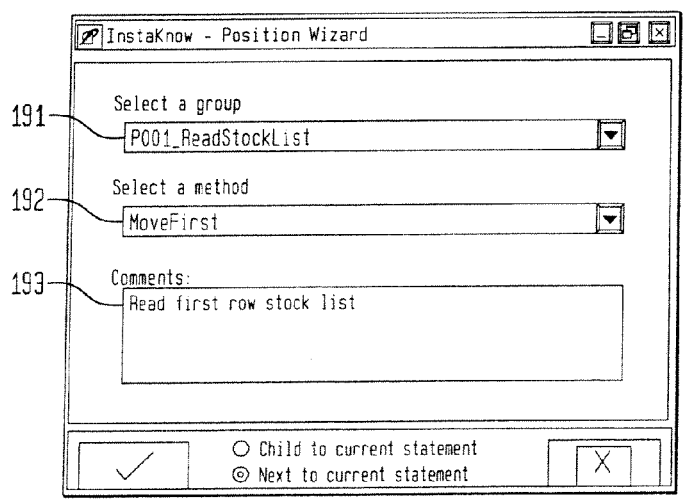
FIG. 19 is a depiction of a screen in the Position Wizard of the program.

The data read from the Excel file is now understood by the wizard-based application as a group of data elements organized by a data group named P001_ReadStockList (see FIG. 19).

Figure 18:
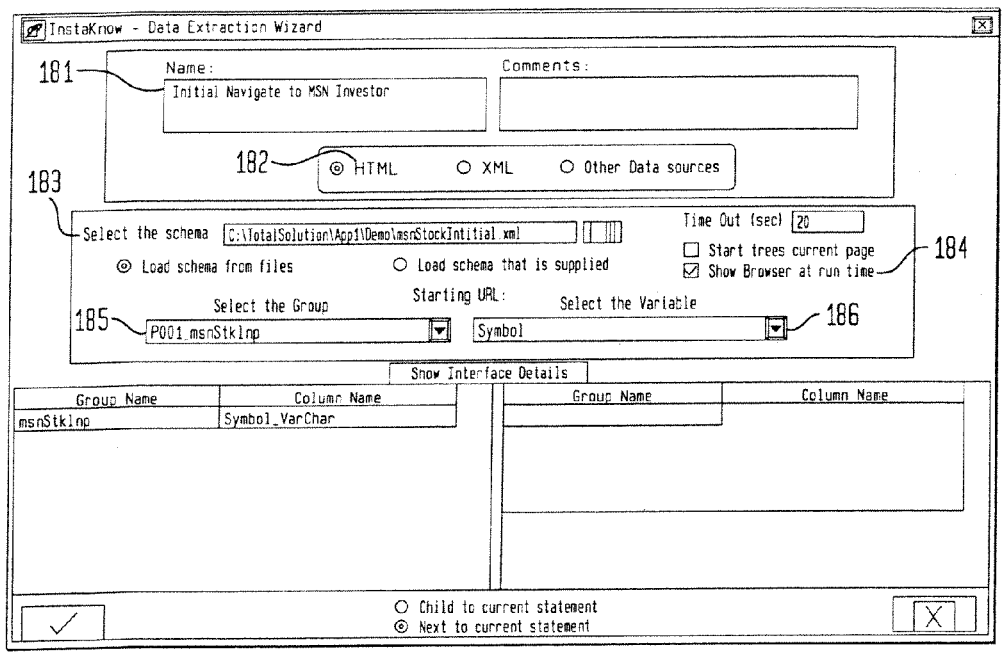
FIG. 18 is a depiction of a screen used in the Data Extraction Wizard of the program.

The second step is again the Extract Data step, but this time it is Web data that is of interest that must be extracted from the Web. As shown in FIG. 18 in the Data Extraction Wizard, the designer clicks on the HTML option 182 of the Data Extraction Wizard, and is presented with the options shown.

The designer gives a name 181 to this data extraction (here Initial Navigate to MSN Investor) and thereafter selects the file schema 183 that has the information stored on how to navigate the Web. Also, the designer selects box 184 to specify whether the Web browser will be visible to the user during the actual playback of this application. From the list of data groups already defined, the designer selects a data group 185, and a data element 186 to which the stock symbol from Excel file will be supplied. In FIG. 18, P001_msnStkInp 185 is the data group, and Symbol 186 is the data element that will receive the stock symbols from the list of symbols read from Excel file (Group—ReadStockList, 124, Element—StockSymbol 125, shown in FIG. 12).

As shown in FIG. 19, the third step, Position Wizard, positions the cursor to the first data element in the data group, named P001_ReadStockList 191. This is the data group that has the entire list of stock symbols read from the Excel file. The method of moving the cursor is specified in dropdown box 192, and comments added at box 193.

Figure 20:
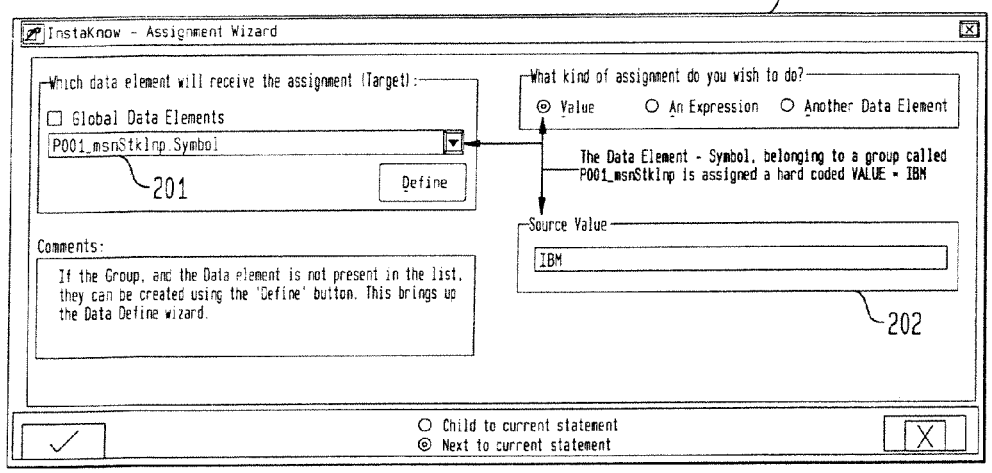
FIG. 20 is a depiction of a screen in the Assignment Wizard of the program.

In step 4, in the Assignment Wizard 200 (FIG. 20), the data group that is going to accept a stock symbol, here P001_msnStkInp.Symbol 201, is forcibly assigned a stock symbol value 202. This step serves as the initialization step. This initializes the Web extraction to go to a well-known Web site, submit SourceValue "IBM" as the stock symbol, and read the result.

Next is Step 5, wherein the Loops Wizard 210 specifies the definition of a conditional loop. The objective is to submit all the stock symbols from the list to the Web page, one at a time, and read the resulting values. So far only the submission-extraction routine (Step 4, FIG. 18) is initialized. Here, a condition is now added that says do the same for rest of the stocks in the list as well. For this, the conditional loop is implemented. The condition 212 in the loop says that until the End of File (EOF) for the data group P001_ReadStockList (which holds the list of stocks read from the Excel file) is not equal to true, do the steps that follow.

Figure 21:
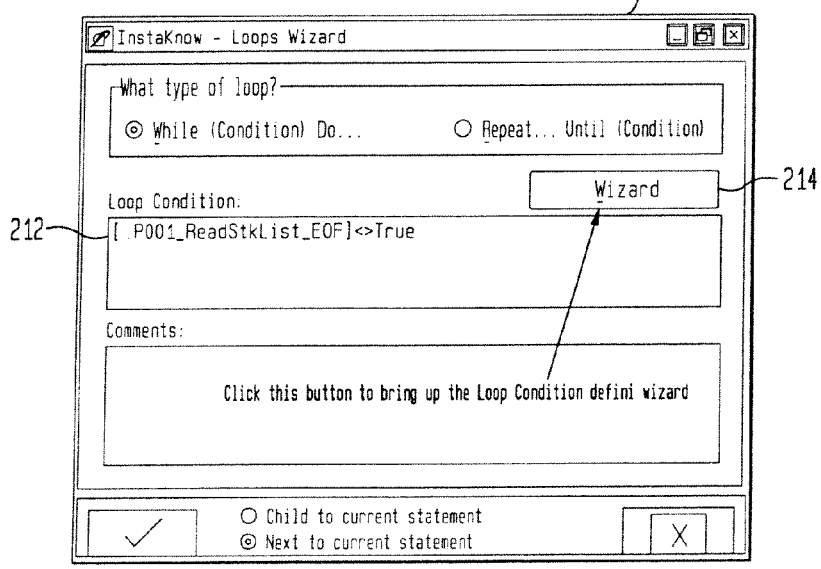
FIG. 21 is a depiction of a screen in the Loops Wizard of the program.
Figure 22:
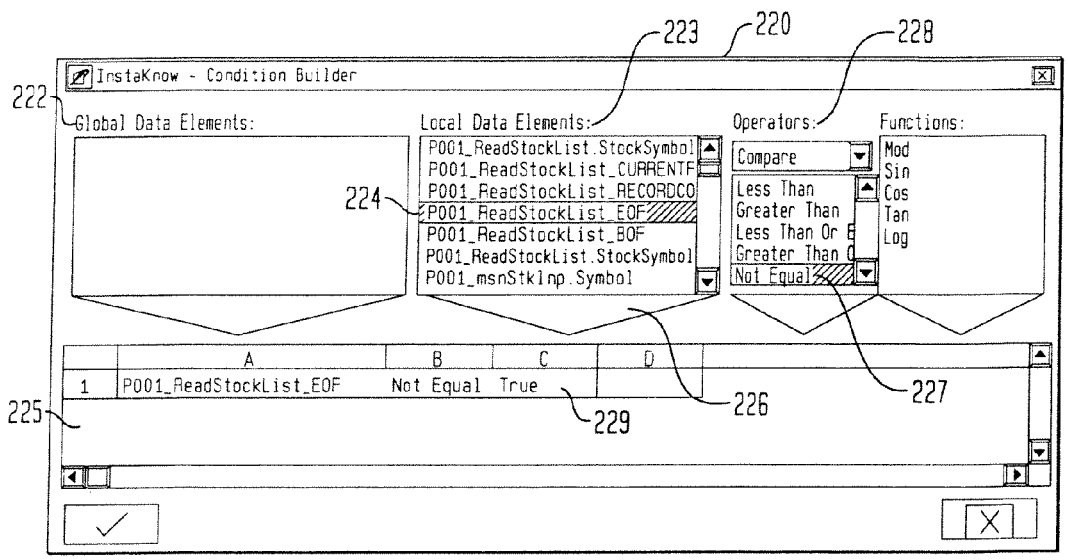
FIG. 22 is a depiction of a screen of the Condition Builder Wizard of the program.

FIG. 22 shows how the condition in FIG. 21 was built. When the designer clicks the Wizard button 214 in the earlier step (FIG. 21), the Condition Builder Wizard 220 is presented. The designer can select any of the application wide data elements, called Global Data Elements' 222, or process specific data elements called Local Data Elements 223. Here, the designer selects P001_ReadStockList_EOF data element 224 because this element specifies whether or not the application has finished reading the list of stock symbols. The selection is added to the lower grid 225 by the click of button 226 below the selection. To this element the designer appends the Not Equal statement 227 from the adjacent selection menu 228. At the end the designer adds True 229 manually by typing in the letters. This completes the definition of conditional loop statement.

Thus far, the designer has defined how to read and store the list of stocks from an Excel file (P001_ReadStockList), and how to obtain one stock value at a time to submit it to the Web page (P001_msnStkInp). A link between them has to be established to transfer the data from one to another, and then to submit it to the Web page.

Figure 23:
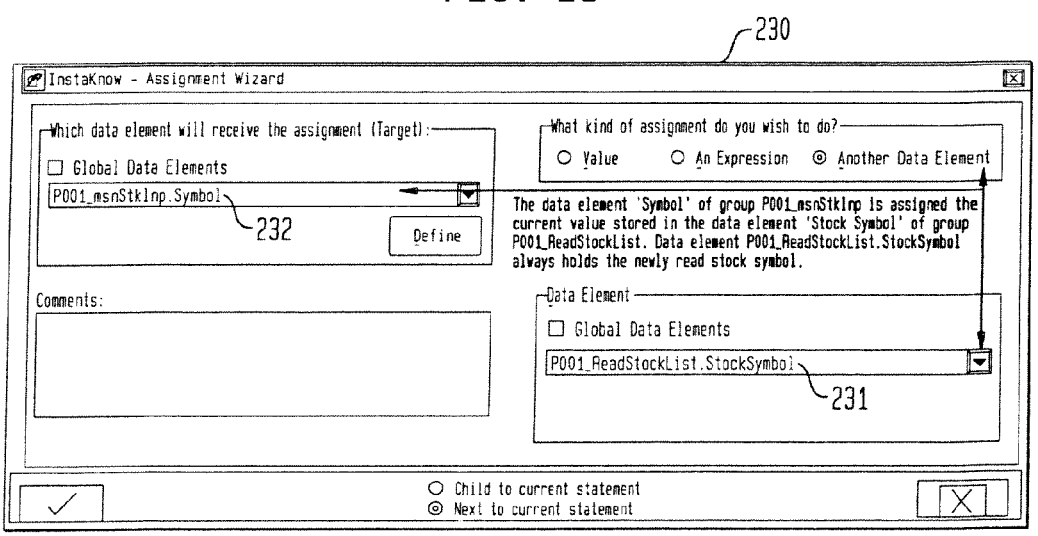
FIG. 23 is a depiction of a screen in the Assignment Wizard of the program.

In step 6, as show in Assignment Wizard 230 of FIG. 23, the current stock symbol P001_ReadStockList.StockSymbol 231 is assigned to the data element P001_msnStkInp 232 that actually does the job of submitting the stock symbol to the Web page.

Figure 24:
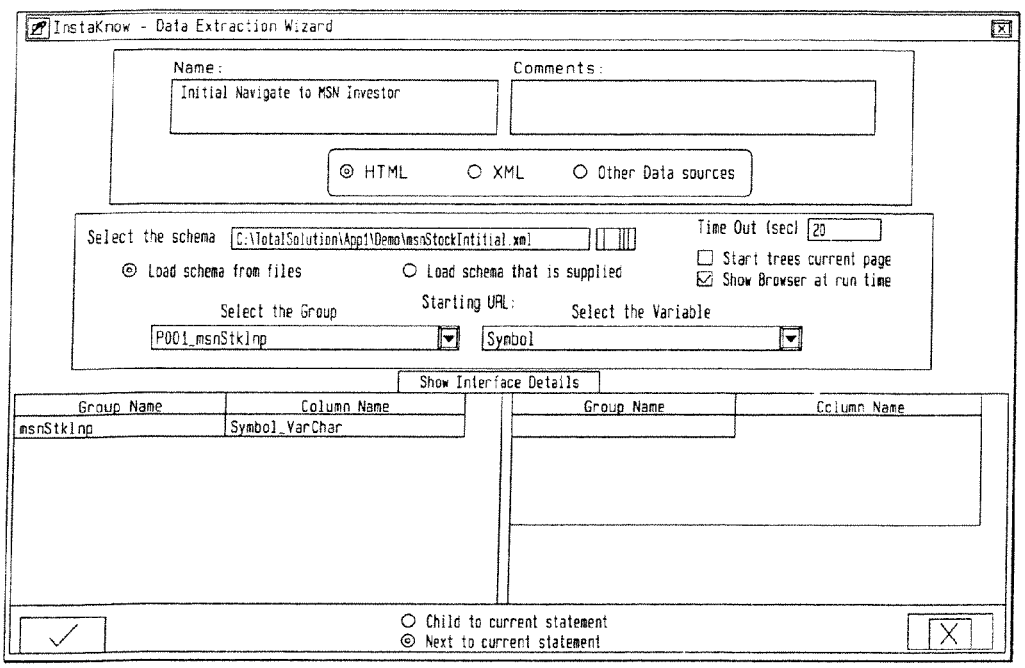
FIG. 24 is a depiction of a screen in the Data Extraction Wizard of the program.

In step 7, shown in FIG. 24, the data extraction Wizard defines data extraction from the Web as done previously in step 2. This step is within the conditional loop, and will be repeated until the condition is true. This means that until all the stock symbols are read, this extract data statement will be repeatedly called for each stock symbol read. This is exactly what the designer intended.

Figure 25:
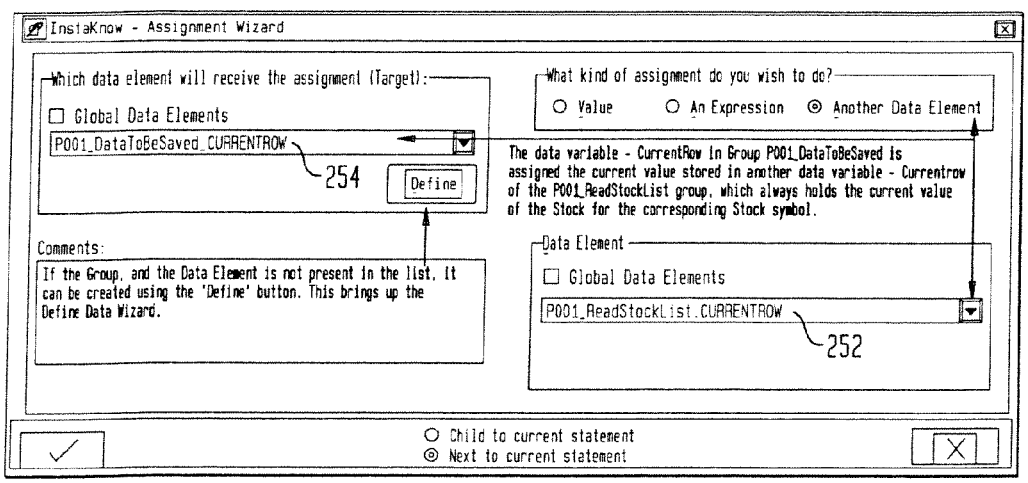
FIG. 25 is a depiction of a screen in the Assignment Wizard of the program.

Step 8 is another assignment statement, as shown in FIG. 25, which will, in the Assignment Wizard, synchronize the rows in the group that holds the list of stocks, the group that receives the Stock Symbol, and current Stock Value. This is basically a synchronization process whereby the current rows in the two data groups, P001_ReadStockList 252 and P001_DataToBeSaved 254 are made to be at the same level. If the stock symbol being read is 10th in the list (P001_ReadStockList), then the P001_ReadStockList_CURRENTROW is 10, and hence the group that stores all the data extracted from the web (P001_DataToBeSaved) will also be asked to make its current row to 10.

Figure 26:
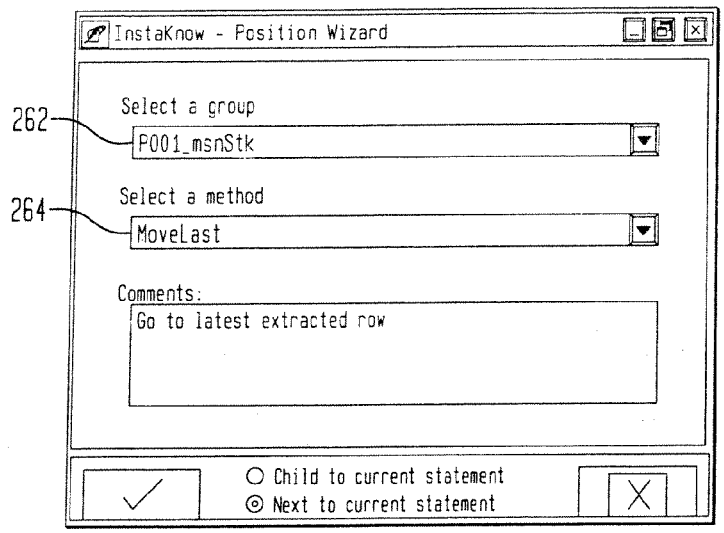
FIG. 26 is a depiction of a screen in the Position Wizard of the program.

In step 9, the program moves the pointer to the last record in the data group that accepts values from the Web as a response to a submission of one stock symbol to the Web. Thus, as shown in FIG. 26, the data group that accepts the values from the Web page for one stock symbol, here group P001_msnStk 262 is made to move its pointer to the last record, by method MoveLast 264. This makes its last row as the current row.

Figure 27:
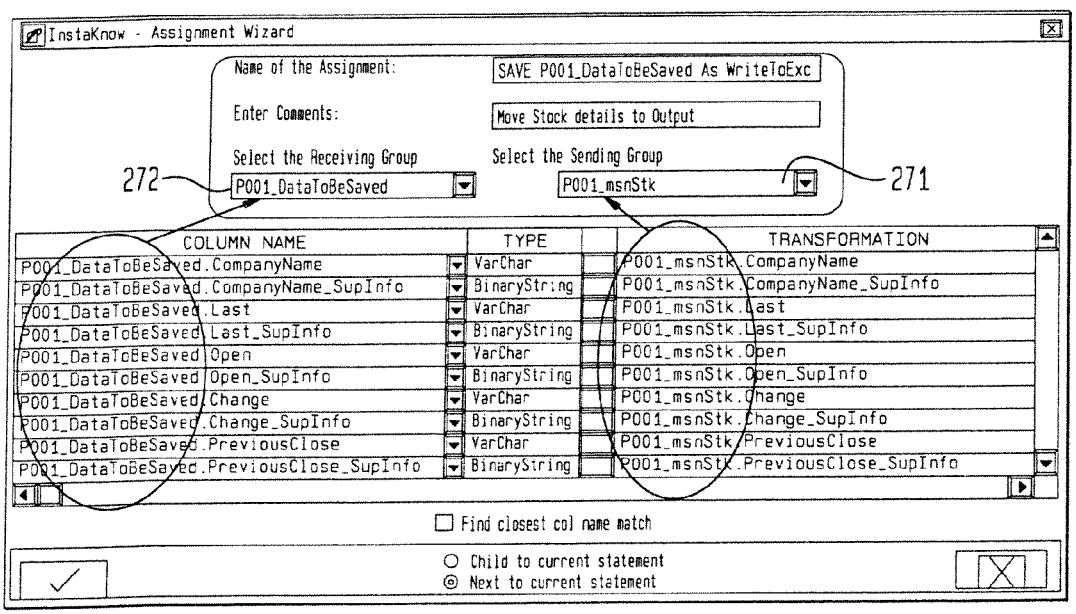
FIG. 27 is a depiction of a screen in the Assignment Wizard of the program.

In step 10, the program assigns the extracted value to the group that will be saved to a file. As shown in FIG. 27, the data that was extracted from the Web, and stored in the data group P001_msnStk 271 is assigned to another data group, P001_DataToBeSaved 272. The data group P001_msnStk 271 is now free to accept Web-extracted data for a new stock symbol. The data group P001_dataToBeSaved keeps adding extracted information for all of the stock symbols in the stock list.

Figure 28:
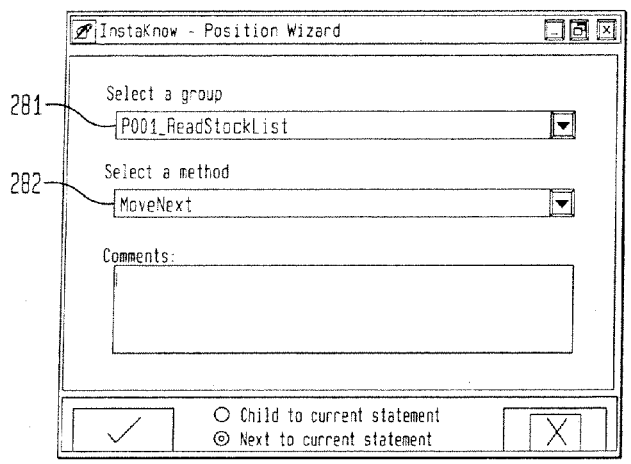
FIG. 28 is a depiction of a screen in the Position Wizard of the program.

In Step 11, shown in FIG. 28, the Position Wizard moves the pointer to next row in the group that holds the stock symbols. The task of submitting one stock symbol to the Web page, and reading the information back into data variables for one stock symbol ends here. Now to read the next stock symbol and repeat the process for the next stock symbol in list, the designer moves ahead the pointer one step selecting the method MoveNext 282, so that the next stock symbol in the list becomes the current stock symbol, and is subsequently submitted to the same Web page. This process will continue until all of the stock symbols in the stock list P001_ReadStockList 281 are read and processed. At the end, the loop condition will not be satisfied, and the application will come out of the loop, and proceed to the next step in the application.

Figure 29:
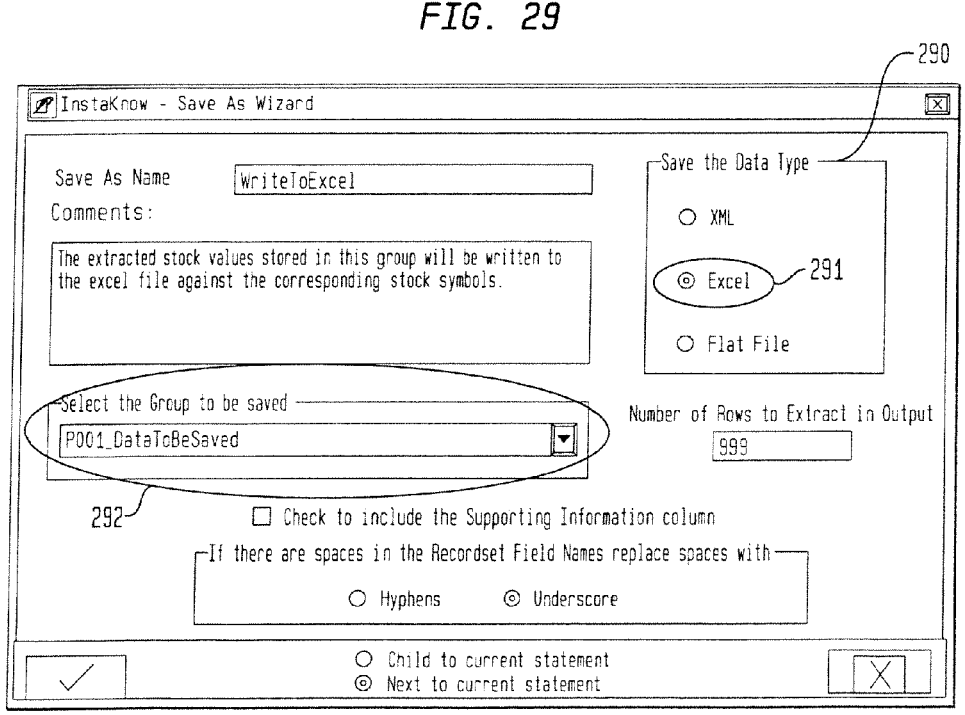
FIG. 29 is a depiction of a screen in the Save As Wizard of the program.

The next step 12 saves the group to an existing Excel file to save the extracted information to a permanent storage space. As shown in FIG. 29, the designer selects Excel file 291 by clicking the appropriate check box in Save As DataType box 290. The designer also selects the data group 292 that will be supplying information to the Excel file for writing to it. The designer had previously defined a group called P001_DataToBeSaved that was updated with information for each of the stock symbol in the list. This data group is selected as the supplier of data to be written to a new Excel file.

Figure 30:
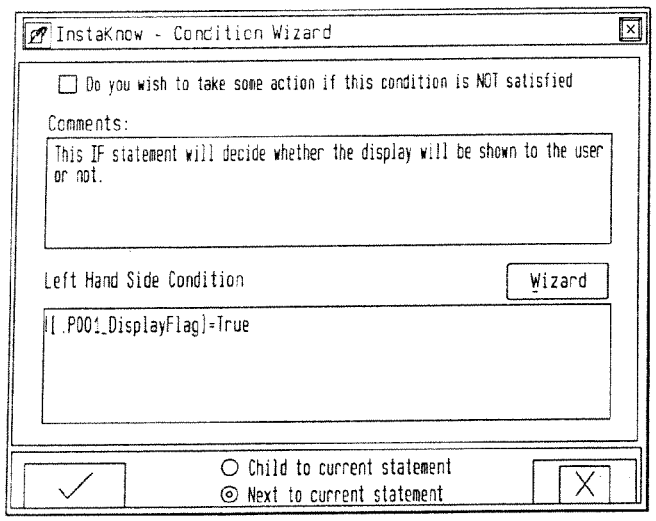
FIG. 30 is a depiction of a screen in the Condition Wizard of the program.

Step 13 is the design of the IF conditional statement using the Conditional Wizard, shown in FIG. 30. The user was asked in step 1 whether he/she would like to view a final output. That same test is applied here in conjunction with the user's answer. If the user replied with a Yes, then the condition is satisfied, and the statement nested inside this conditional statement is executed. Otherwise, it is not executed.

Figure 31:
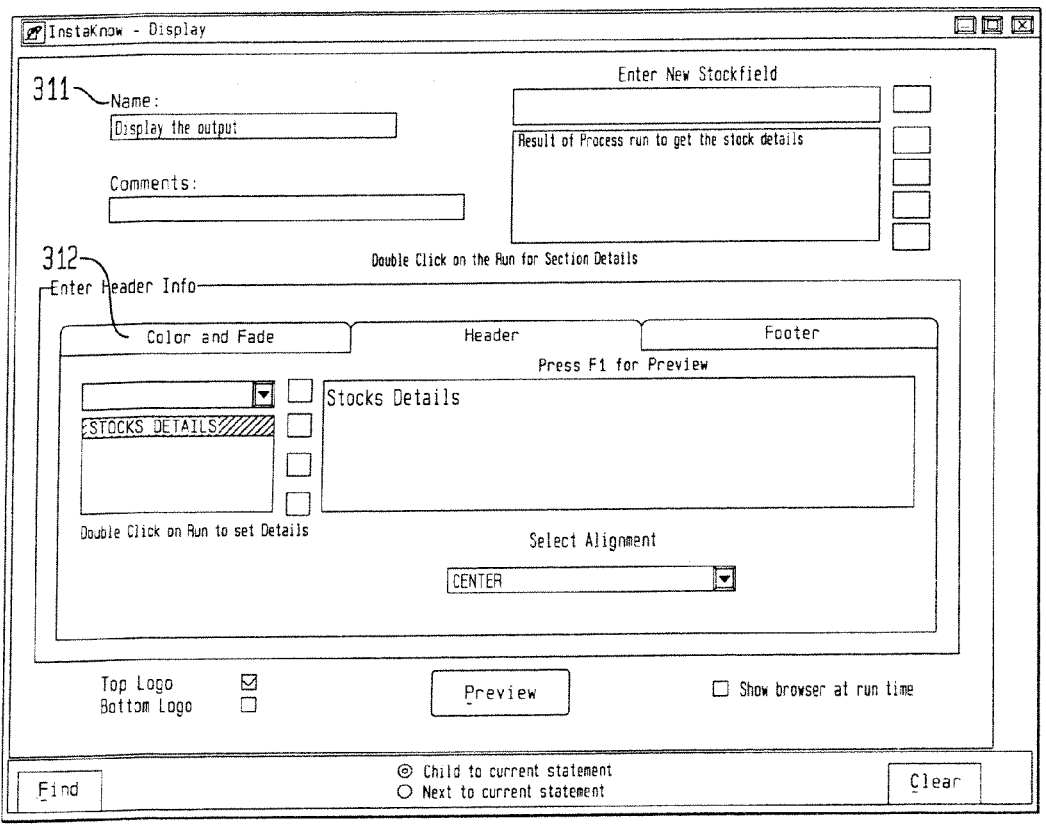
FIG. 31 is a depiction of a screen in the Display Wizard of the program.

The last step is the design of the output statement, including headers, footers, and logos. The design of the output works in two parts. The first part is the design of the layout of the page itself. The designer gives a name 311 to this design step (FIG. 31). Then the designer enters the text that will be actually printed on the output and formats the text to his/her desire using various menus 312 available on the Display Wizard.

Figure 32:
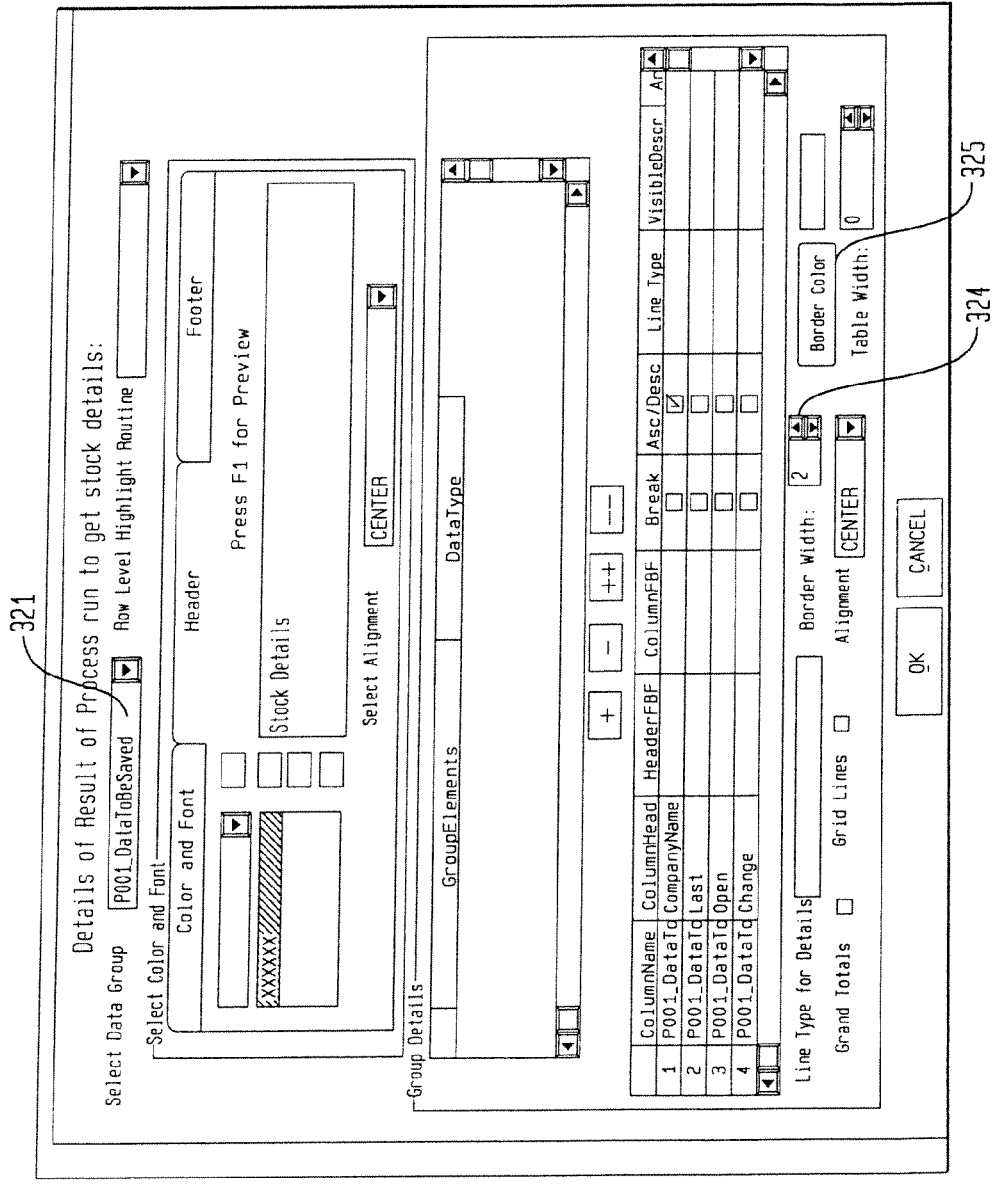
FIG. 32 is a depiction of another screen in the Display Wizard of the program.
Figure 33:
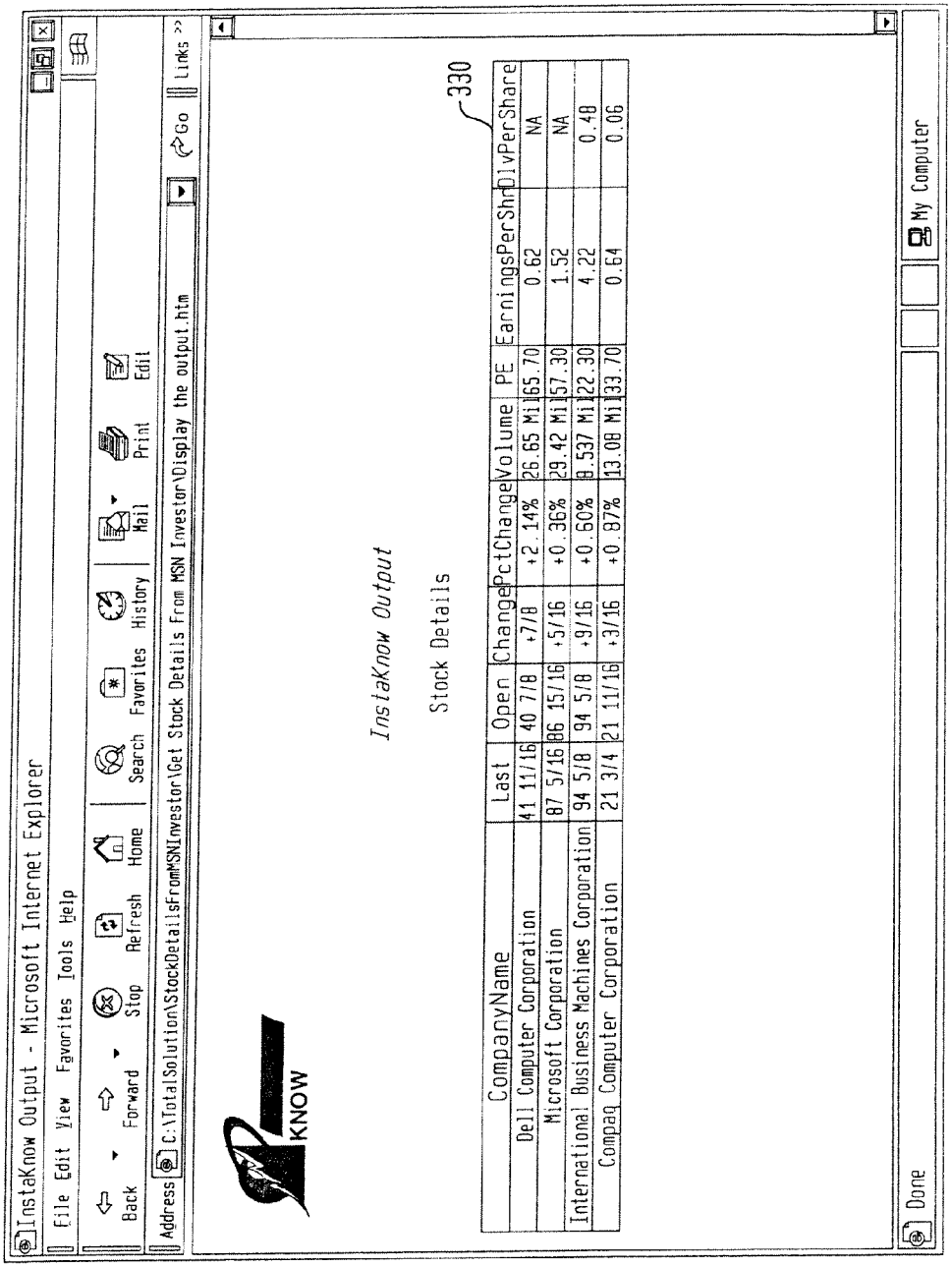
FIG. 33 is a depiction of the final data output generated by the program.

In the second step of data output design, shown in FIG. 32, the designer decides which data is to be outputted. In this example, the data extracted from the Web was saved in the data group called P001_DataToBeSaved 321. The same data group is selected to print its element values to the output. The data will be arranged by ascending order based on the company name. The data will be presented in a tabular format. Hence, options such as table border width 324 and border color 325 is also selected. This completes the entire design process for the application. The final data output is shown in FIG. 33, which displays table 330 in HTML output with the stock details.

Figure 34:
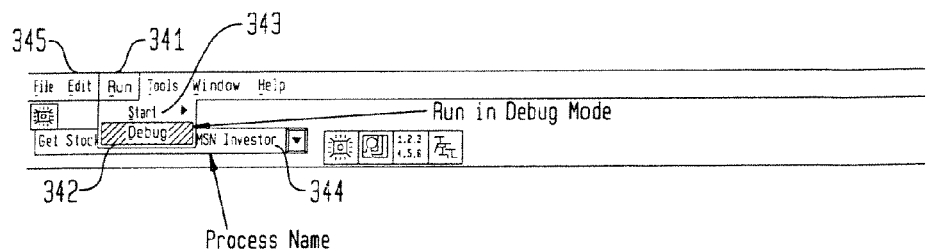
FIG. 34 is a depiction of a screen from the main menu of the program.

The application also provides a Debug phase 342, accessible from Run menu 341 (FIG. 34). The playback of an application in the Debug phase is to test and correct each individual step in the processes defined. The user can start/stop the business logic after each step for verification (debugging) purposes.

To run application in Debug Phase, the designer selects the application file in which the application logic was saved after it was defined in the design mode. This is done through the File and Open menu buttons located on the top of the screen. The program then reads this file and populates all the information from the file in its memory. The wizard-based tool reproduces the application steps from its memory in the form of a design tree, as had been defined during the design step.

To run the application recently loaded in a debug mode, the designer goes to the menu option 341 labeled Run. Under this menu, there are submenus like Start and Debug. The submenu Debug 342 will playback the application in a debug mode one step at a time.

Similarly, if the designer wants to test another process inside this application in isolation, he/she can do so by selecting the process name from the drop down box 344 near the file menu. This action will refresh the designer window, and load the steps in the designer window that are specific to the selected process. Thereafter, the designer has to go back to the main menu, select Run, and then select the submenu under it called Start 343. Start has further two submenus called Start Application, and Start Process. The Start Process submenu will start the selected process in debug mode.

To make changes in a process/application step while in Playback (debug mode) the designer has to double click the step that he/she wants to edit. This will pop up a wizard specific to that step with the relevant current information. The changes made to this wizard will be saved, and a rerun of the process will use the changed values for that step thereafter. Highlighting a step in the desired process, and clicking the Edit button 345 on the tool bar can also perform the edit operation. The click on Edit menu 345 presents three new submenus Application, Current Selection, and Delete Current Node. The Current Selection submenu allows the designer to edit the contents of the highlighted step.

Once the playback starts, the wizard-based programming application reads each step of the process tree one by one. The verb at each step helps the application to decide what kind of action is to be performed next. The conditional loops appear in the design steps only once. The application development software preferably intelligently handles such conditions by actually looping the steps until the looping condition is satisfied.

After being satisfied that the logic is working correctly, the user can schedule the business logic to run automatically at pre-determined frequencies, including on demand. In the run phase, the logic runs automatically without any user intervention. In this mode, the user does not see the design steps, nor does he see the wizards. The job of selecting processes and submitting them to the application is performed through the Scheduler. This sometimes also is referred to as the silent mode of operation.

In the run phase, the application reads the application file in its memory, and arranges the steps of the processes internally in its memory and does not display them in a tree format as is done in the design phase.

Figure 35:
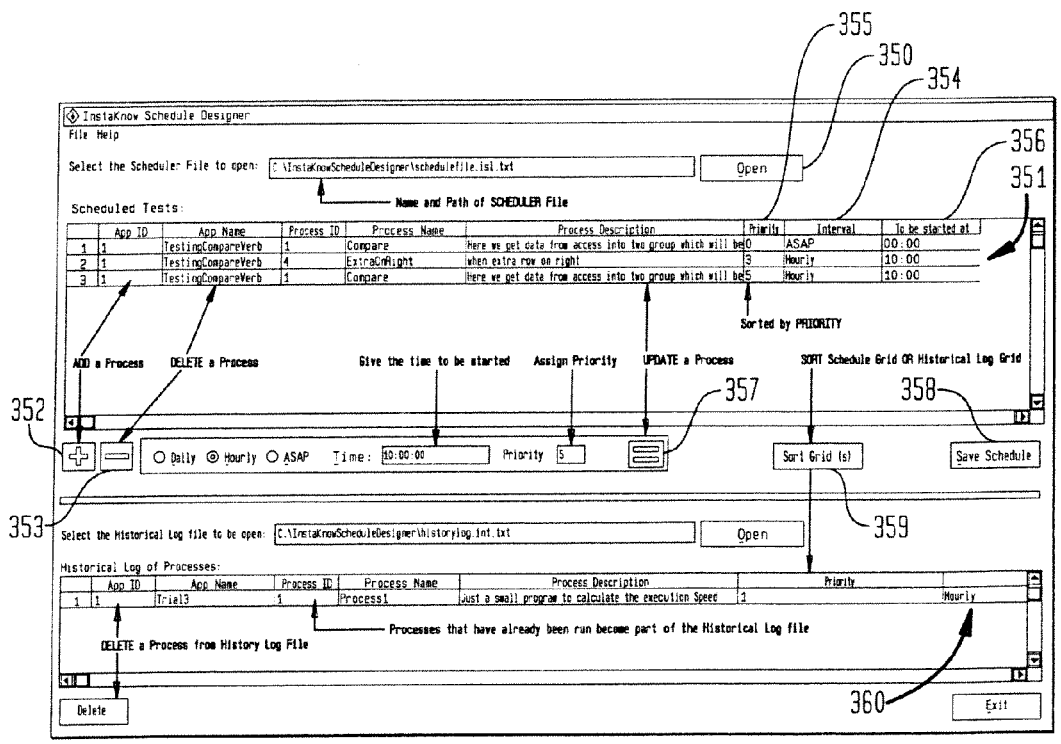
FIG. 35 is a depiction of the Scheduled Designer of the program.

A schedule designer and a scheduler are used in conjunction to create a schedule of processes and then run them automatically on the defined schedule. The schedule designer, shown in FIG. 35, can add, update and delete processes to a schedule file. It can also create a brand new scheduler file and add processes to it. The Open button 350 opens an existing or new scheduler file. If there are already some processes in the existing scheduler file, they are listed in the Scheduled Test grid 351. A new process can be added by clicking the "+" (plus) button 352. This brings up another form that reads the InstaKnow design files and picks up the processes, and arranges them in a grid. The designer can selectively pick processes from this wizard form to transfer them to the actual list of scheduled processes.

To delete a process from the grid and from the scheduler, highlight the process in the Scheduled Tests grid 351 and clicks the "−" button 353 to delete it.

To update a process, the user highlights the process in the Scheduled Tests grid 351 then selects one of the interval options, namely Daily, Hourly, or ASAP (for As Soon As Possible) in Interval column 354. If the process is ASAP, it is assigned a priority code of zero (0) in Priority column 355 and goes as the topmost priority. Then, the user gives the actual time that the process in concern is supposed to run in Column 356. For example, if the user wants to run a process P1 every hour at 35 minutes past the hour, the user will check the 'Hourly' option, and type 35:00 in the adjacent box. After the information is provided, the user clicks the "=" (equal) button 357, and the information will be updated in the highlighted row of the grid in their appropriate places.

Figure 36:
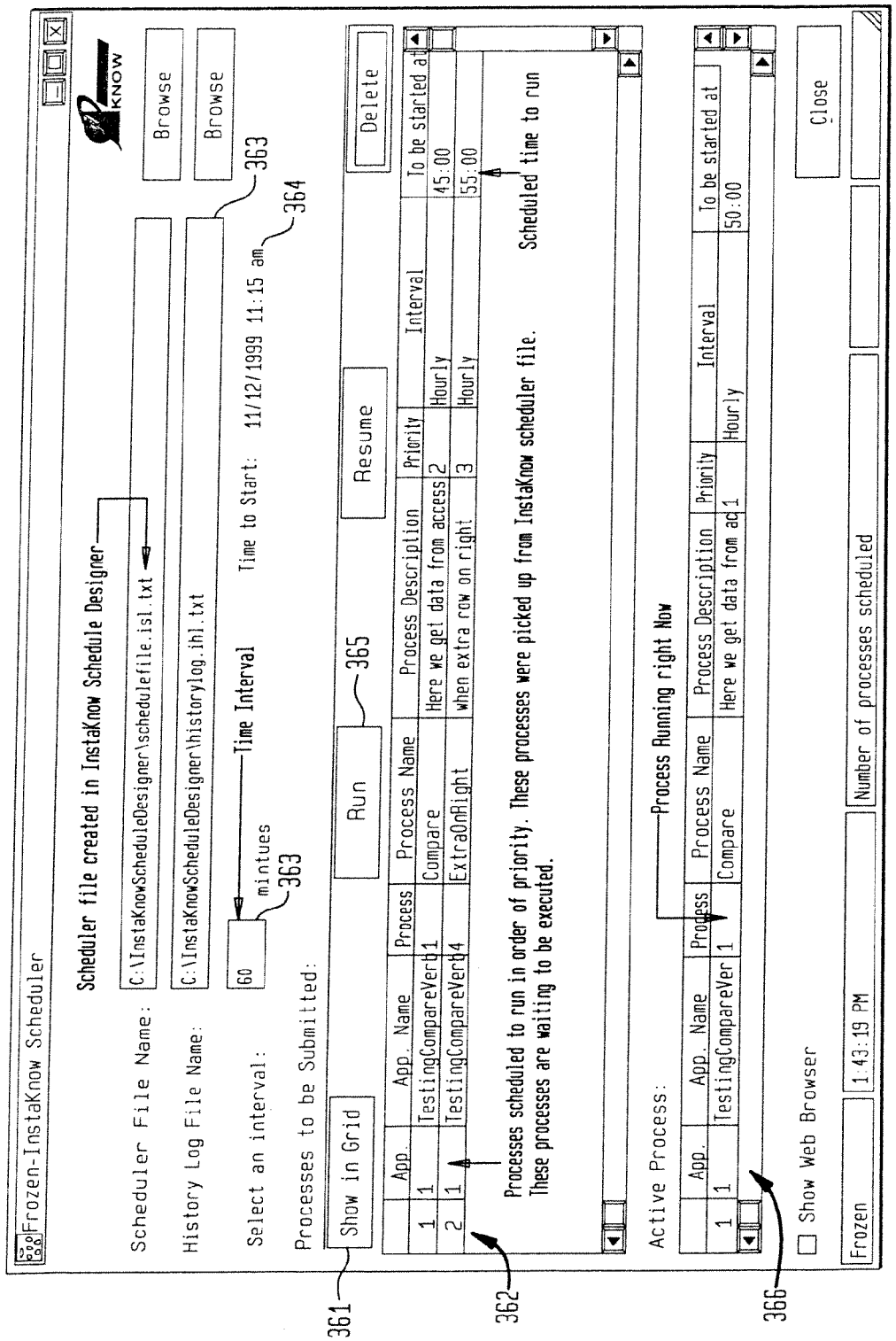
FIG. 36 is a depiction of the Schedule Wizard of the program.

After all the processes have been assigned a time to start and priority, the scheduler file should be saved using Save button 358 to save the updated information to be used in the InstaKnow Scheduler, shown in FIG. 36.

A sort option is provided to the designer by clicking on Sort Grid(s) button 359 to sort the Scheduled Tests grid, and the Historical Log of Processes grids. The sorting operation is performed based on the grid columns such as priority, process ID, and application ID.

The lower grid Historical Log of Processes 360, displays the processes that have been already processed by the Scheduler. This allows the designer to perform checks on the already run processes for results, and errors.

The Scheduler (FIG. 36) is in charge of actually submitting the scheduled processes to the application. The scheduler file that was created is opened to read the scheduler information. The Show in Grid button 361 actually displays the eligible processes in the 'Processes to be Submitted' grid 362 below. The Historical Log File 363 also is opened so that the processed processes can be written out to the historical log file with appropriate messages.

A 'Time interval' and the 'Time to start' are assigned. These two times work in conjunction to decide which process will be pulled, and be submitted to InstaKnow application, and which process actually is submitted. The time interval is the time between the start time and the future time between which all the processes will be scheduled. In FIG. 36 the time interval 363 is 60 minutes, and the start time 364 is Nov. 12, 1999 at 11:15:00 am. When the scheduler file is opened, the InstaKnow scheduler checks the 'time to be run' time stamps on each process, and decides if that process falls between 11:15:00 am and 60 minutes beyond it, i.e., 12:15:00. FIG. 36 shows that all the three processes have been scheduled hourly to be run ranging from 45 minutes to 55 minutes, and three fall between the time interval specified. Therefore, they will be scheduled to run.

A click on the Run button 365 actually starts the scheduling process. The first process in the Processes To be Submitted grid 362 is removed from this grid and brought in the lower grid 366 named 'Active Processes' to show which process has been scheduled.

Once this process is finished running, it is removed from the Active Process grid 366 and is replaced by the new active process. Before a newly active process replaces the current process, the information is written out to the historical log file. The cycle continues until all the processes from the Processes to be Submitted grid 362 have been submitted.

After a complete cycle, the Scheduler goes in the sleep mode till the time interval is completed. In the example, Scheduler will wake up every one-hour, schedule the processes from the scheduler file, and start submitting them to the InstaKnow application.

Using an improved feature of transportable intelligence, multiple Web based computing resources cannot only automatically share data with each other, they can automatically share business rules or business intelligence with each other when required. The business intelligence can be immediately executed by the receiving computer.

The application development program keeps all conditional business logic as a data file/string called a knowledge Element or a Knowlet. This business intelligence can be supplied by one computer to other computers by simply transferring the Knowlet string over the Internet to an authorized and willing computer, which can then immediately execute that business logic under its own control.

In one business example of transportable business intelligence, a user can determine the best shipping cost quote using custom criteria. A customer visiting a Web-based Shipping Marketplace requests a quote for a commodity purchase. The complete quote consists of the commodity price plus the shipping price. However, in this case, the particular customer has the unique demand to find the cheapest shipper who will give at least a 15% discount on shipping charges if the shipping charges exceed 3% of the purchase price.

Since this conditional business rule is non-standard, it cannot be pre-supported by the Commodity or Shipping Marketplace. One of the few ways to support such custom business rules is to actually transfer the unique business rules, not just context sensitive business data, to the collaborating party (in this example the Shipping Marketplace) by encapsulating the rules as Knowlet data string and transferring it over the Internet to a partner.

Knowlets can be forwarded from partner to partner-unlimited number of times. Additional custom data and intelligence can be added to Knowlets in context specific ways before they are forwarded.

Using the application development software's 'transportable intelligence' capability, innovative services can be provided by collaborating partners across the Internet to satisfy customized demands and add value to the value chain.

Figure 37:
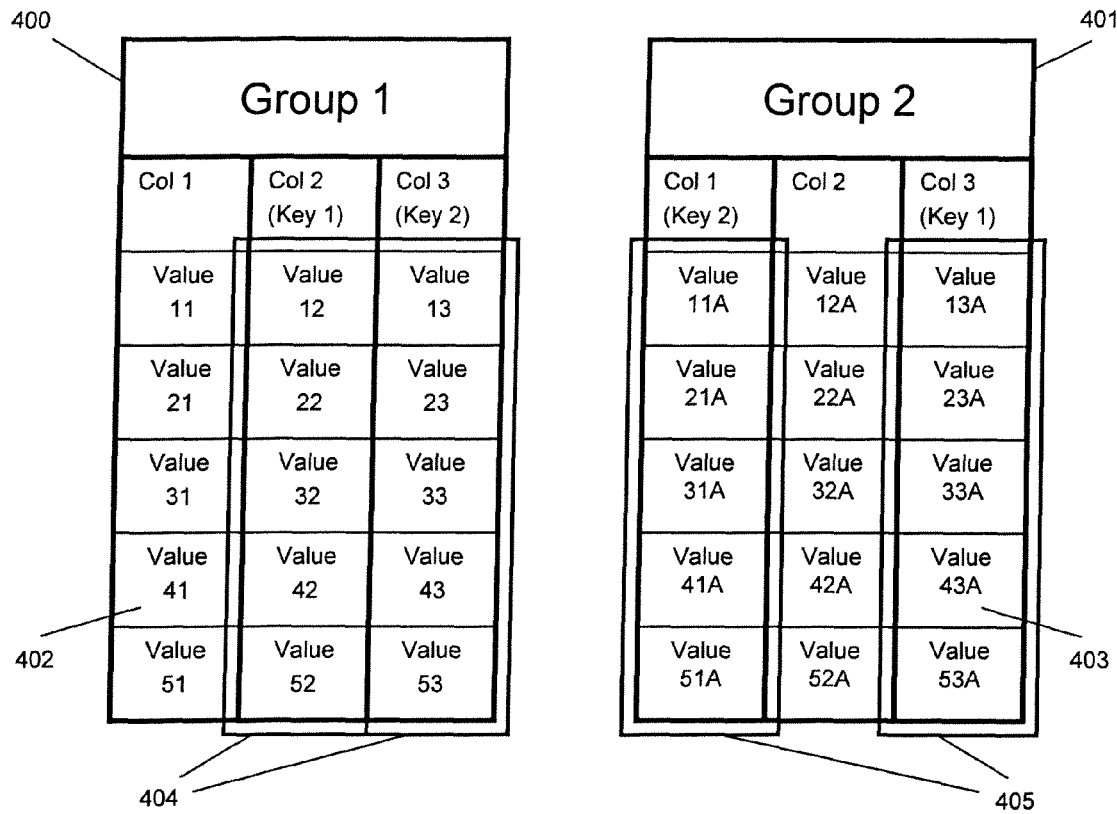
FIG. 37 is a block diagram of the operation of the Compare verb.
Figure 37:
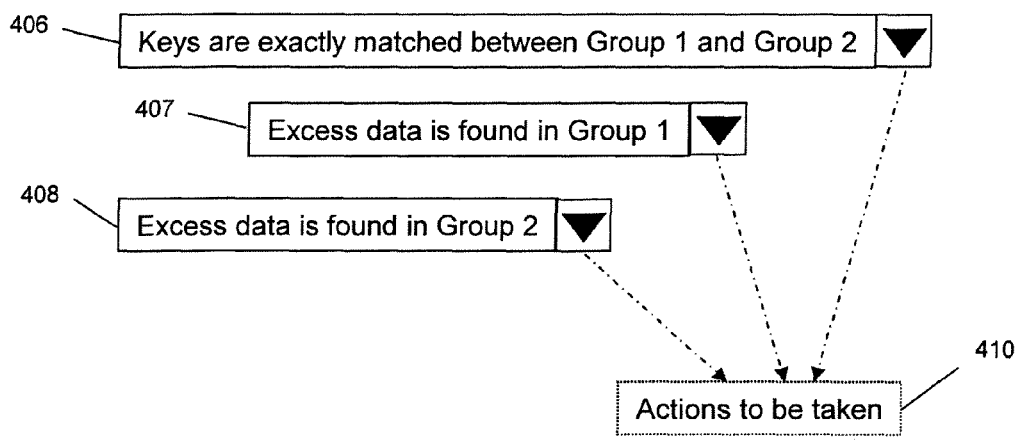

FIG. 37 illustrates the operation of the "Compare" verb described above. As noted above, verbs are selectable by the user to implement business rules used in the application and the user can choose at least one of the verbs to define an action to be performed by the application when executed. The verb Compare compares the current values 402 (e.g., Values 11, 12, 13, 21, 22, 23, etc.) stored in rows of one group 400 (e.g., Group 1) to the current values stored in the rows elements 403 (e.g., Values 11A, 12A, 13A, 21A, 22A, 23A etc.) of another group 401 (e.g., Group 2). The comparison is based on keys 404 and 405 defined on both the group data elements. Actions 410 to be taken in following situations can be specified:

Situation 406: Keys are exactly matched between left side group (Group 1) and right side group (Group 2)

Situation 407: Excess data is found in left side group (Group 1)

Situation 408: Excess data is found in right side group (Group 2)

As these and other variations and combinations of the features discussed above can be utilized without departing from the present invention as defined by the claims, the foregoing description of the preferred embodiments should be taken by way of illustration rather than by way of limitation of the present invention.

The invention claimed is:

1. A computer-implemented method of constructing a computer application for automatically implementing a complex comparison programming task, comprising:

providing a compare design wizard to a display of a user's computer, wherein the user interacts with the compare design wizard to specify (a) at least first and second data groups each containing associated data elements, (b) one or more keys from the first data group, and (c) one or more keys from the second data group, the keys comprising data elements that the user desires to be compared by the computer application;

the user further interacting with the compare design wizard to specify one or more actions to be taken by the computer application based on data element comparisons to be performed by the computer application of: the keys matching between the first and second data groups; excess data being found in one of the groups; and excess data being found in a different one of the groups.

2. The computer-implemented method of claim 1, further comprising the compare design wizard providing graphical, user-selectable elements for the user to select the data groups and actions.

3. The computer-implemented method of claim 1, further comprising running the computer application following a user's completion of interacting with the compare design wizard.

4. A computer readable storage medium storing instructions, which when executed by a processor, constructs a computer application for automatically implementing a complex comparison programming task, the instructions causing the processor to:

provide a compare design wizard to a display of a user's computer, wherein the user interacts with the compare design wizard to specify (a) at least first and second data groups each containing associated data elements, (b) one or more keys from the first data group, and (c) one or more keys from the second data group, the keys comprising data elements that the user desires to be compared by the computer application;

the user further interacting with the compare design wizard to specify one or more actions to be taken by the computer application based on data element comparisons to be performed by the computer application of: the keys matching between the first and second data groups; excess data being found in one of the groups; and excess data being found in a different one of the groups.

5. The computer readable storage medium of claim 4, wherein the instructions further cause the processor to cause the compare design wizard to provide graphical, user-selectable elements for the user to select the data groups and actions.

6. The computer readable storage medium of claim 4, wherein the instructions further cause the processor to run the computer application following a user's completion of interacting with the compare design wizard.

7. A computer apparatus for constructing a computer application for automatically implementing a complex comparison programming task, comprising, the computer apparatus comprising a processor programmed to:

provide a compare design wizard to a display of a user's computer, wherein the user interacts with the compare design wizard to specify (a) at least first and second data groups each containing associated data elements, (b) one or more keys from the first data group, and (c) one or more keys from the second data group, the keys comprising data elements that the user desires to be compared by the computer application;

the user further interacting with the compare design wizard to specify one or more actions to be taken by the computer application based on data element comparisons to be performed by the computer application of: the keys matching between the first and second data groups; excess data being found in one of the groups; and excess data being found in a different one of the groups.

8. The computer apparatus of claim 7, wherein the processor further causes the compare design wizard to provide graphical, user-selectable elements for the user to select the data groups and actions.

9. The computer apparatus of claim 7, wherein the processor further runs the computer application following a user's completion of interacting with the compare design wizard.

* * * * *

UNITED STATES PATENT AND TRADEMARK OFFICE
CERTIFICATE OF CORRECTION

PATENT NO. : 7,979,377 B2
APPLICATION NO. : 12/012951
DATED : July 12, 2011
INVENTOR(S) : Pramod Khandekar It is certified that error appears in the above-identified patent and that said Letters Patent is hereby corrected as shown below:

Column 2, line 30, "convention" should read --conventional--.
Column 2, line 46, "(ASP scripting." should read --(ASP scripting).--.
Column 4, line 8, "on" should read --on a--.
Column 4, line 12, "rules based" should read --rules-based--.
Column 4, line 20, "rules based" should read --rules-based--.
Column 4, line 20, after "application" delete ",".
Column 4, line 45, "interacting" should read --interacts--.
Column 5, line 1, after "is" insert --a--.
Column 5, line 3, after "is" insert --a--.
Column 5, line 5, after "is" insert --a--.
Column 5, line 7, after "is" insert --a--.
Column 6, line 11, "such" should read --such as--.
Column 6, line 21, "such" should read --such as--.
Column 6, line 35, after "with" insert --the--.
Column 7, line 15, "hard coded" should read --hard-coded--.
Column 7, line 34, "hard coded" should read --hard-coded--.
Column 7, line 36, after "on" insert --the--.
Column 7, line 38, after "controls" insert --,--.
Column 8, line 8, "rules based" should read --rules-based--.
Column 8, line 12, "rules based" should read --rules-based--.
Column 8, line 27, "hard coded" should read --hard-coded--.
Column 8, line 49 & 50, after "application" delete ",".
Column 8, line 67, after "application)" insert --,--.
Column 9, line 31 & 32, "Web based" should read --Web-based--.
Column 10, line 9, "Web sites" should read --Websites--.
Column 10, line 31, "user specified" should read --user-specified--.
Column 10, line 33, "point and click" should read --point-and-click--.
Column 10, line 67, "is" should read --are--.
Column 11, line 19, "another" should read --other--.

Signed and Sealed this
Thirty-first Day of July, 2012

David J. Kappos
*Director of the United States Patent and Trademark Office*

CERTIFICATE OF CORRECTION (continued)
U.S. Pat. No. 7,979,377 B2

Column 11, line 46, "a" should read --an--.
Column 13, line 53, "permissions" should read --permission--.
Column 13, line 65, "web based" should read --web-based--.
Column 13, line 65, after "InstaKnow" delete ",".
Column 14, line 2, "can construct" should read --constructing--.
Column 14, line 2, "in plain" should read --in a plain--.
Column 14, line 29, "bottom" should read --bottom-most--.
Column 14, line 31, after "113" insert --,--.
Column 15, line 8, "an" should read --and--.
Column 15, line 12, after "instance," insert --if--.
Column 15, line 21, "appears" should read --appear--.
Column 15, line 64, after "for" insert --the--.
Column 17, line 1, "task" should read --tasks--.
Column 17, line 3, "ends" should read --end--.
Column 17, line 23, "symbol" should read --symbols--.
Column 17, line 48, "is" should read --are--.
Column 18, line 2, "playback" should read --play back--.
Column 18, line 63, "clicks" should read --click--.
Column 18, line 19, after "360" delete ",".
Column 19, line 63, "Web based" should read --Web-based--.
Column 20, line 25 & 26, "partner-unlimited" should read --partner an unlimited--.
Column 22, line 12, delete "comprising".